(12) United States Patent
Shirayanagi

(10) Patent No.: US 6,366,823 B1
(45) Date of Patent: Apr. 2, 2002

(54) DESIGN METHOD FOR OPTICAL CURVED SURFACE

(75) Inventor: Moriyasu Shirayanagi, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,663

(22) Filed: Jul. 29, 1999

(30) Foreign Application Priority Data

Jul. 30, 1998 (JP) .......................................... 10-216244

(51) Int. Cl.$^7$ ............................. G06F 17/50; G02B 3/02
(52) U.S. Cl. .......................... 700/97; 700/117; 351/169
(58) Field of Search ........................... 700/97, 98, 117; 351/161, 168, 169, 170, 171, 172, 177

(56) References Cited

U.S. PATENT DOCUMENTS

| | | | |
|---|---|---|---|
| 3,950,082 A | 4/1976 | Volk | 351/169 |
| 4,729,651 A | 3/1988 | Kitani | 351/169 |
| 4,838,675 A * | 6/1989 | Barkan et al. | 351/169 |
| 4,906,090 A | 3/1990 | Barth | 351/169 |
| 5,861,935 A * | 1/1999 | Morris et al. | 351/169 |
| 5,886,766 A | 3/1999 | Kaga et al. | 351/169 |
| 6,220,704 B1 * | 3/2001 | Mukaiyama et al. | 351/169 |
| 6,260,967 B1 * | 7/2001 | Edwards et al. | 351/169 |
| 6,302,540 B1 * | 10/2001 | Katzman et al. | 351/161 |

FOREIGN PATENT DOCUMENTS

| | | |
|---|---|---|
| DE | 2610913 | 9/1977 |
| EP | 0744646 | 11/1996 |
| JP | 55-146412 | 11/1980 |
| JP | 61-252525 | 11/1986 |
| JP | 2-46418 | 2/1990 |
| WO | 96/11421 | 4/1996 |

OTHER PUBLICATIONS

Patent Abstract of Japan, vol. 005, No. 017, published Nov. 14, 1980, of Japanese Publication No. 55-146412, to SEIKO EPSON CORP., which was published on Nov. 14, 1980.

Shirayanagi, Moriyasu, "Development of Thin Aspheric Design Progressive Power Lens 'Joyas,'" Japanese Journal of Opthalmic Science Technology, vol. 1, No. 1, p. 43–48, Jul. 1997, along with an English Language Translation.

* cited by examiner

Primary Examiner—Paul P. Gordon
(74) Attorney, Agent, or Firm—Greenblum & Bernstein, P.L.C.

(57) ABSTRACT

A design method for an optical curved surface, includes: dividing an optical curved surface into a plurality of rectangular areas that are divided by a lattice; defining an original lattice point on the lattice, a backbone line that crosses the original lattice point on the lattice, and standard lattice points that are the lattice points located on the backbone line except the original lattice point; applying curvatures to all of the lattice points; applying inclinations to the original lattice point and the standard lattice points; applying sag to the original lattice; calculating a sectional shape of the curved surface along the backbone line based on the sag and inclination of the original lattice point and the curvatures of the lattice points on the backbone line; calculating sags of the standard lattice points based on the calculated sectional shape; calculating sectional shapes along orthogonal lines that are orthogonal to the backbone line based on the calculated sags and the applied inclinations of the standard lattice points and the applied curvatures of the lattice points on the orthogonal lines; and representing the rectangular areas as mathematical functions respectively based on the calculated sectional shapes.

14 Claims, 23 Drawing Sheets

FIG. 3

I= 4    CXkl= -8.28E-03
J= 8    CYkl= -3.73E-03
K= 2    BYkl=  0.00E+00
L= 4    Zkl =  0.00E+00

| Yj | ΔCYkj | BXkj | Xi | -6.00 | -3.00 | 0.00 | 3.00 | 6.00 |
|---|---|---|---|---|---|---|---|---|
|  |  |  | j\i | 0 | 1 | 2 | 3 | 4 |
| 60.00 | -3.98E-03 | -4.66E-02 | 8 | 1.04E-02 | 9.83E-03 | 9.67E-03 | 9.97E-03 | 1.06E-02 |
| 45.00 | -1.08E-03 | -4.70E-02 | 7 | 1.57E-03 | 1.42E-03 | 1.33E-03 | 1.41E-03 | 1.55E-03 |
| 30.00 | 1.17E-05 | -4.97E-02 | 6 | 5.40E-04 | 3.67E-04 | 3.19E-04 | 3.74E-04 | 5.31E-04 |
| 15.00 | 7.49E-05 | -5.17E-02 | 5 | 3.08E-04 | 1.25E-04 | 7.28E-05 | 1.50E-04 | 2.98E-04 |
| 0.00 | 0.00E+00 | -5.24E-02 | 4 | 2.44E-04 | 6.62E-05 | 0.00E+00 | 5.79E-05 | 2.06E-04 |
| -15.00 | 7.49E-05 | -5.17E-02 | 3 | 3.08E-04 | 1.25E-04 | 7.28E-05 | 1.50E-04 | 2.98E-04 |
| -30.00 | 1.17E-05 | -4.97E-02 | 2 | 5.40E-04 | 3.67E-04 | 3.19E-04 | 3.74E-04 | 5.31E-04 |
| -45.00 | -1.08E-03 | -4.70E-02 | 1 | 1.57E-03 | 1.42E-03 | 1.33E-03 | 1.41E-03 | 1.55E-03 |
| -60.00 | -3.98E-03 | -4.66E-02 | 0 | 1.04E-02 | 9.83E-03 | 9.67E-03 | 9.97E-03 | 1.06E-02 |
|  |  |  |  | ΔCXij | | | | |

●    $Z_{ij}$

—    $BX_{ij}$

|    $BY_{ij}$

⌒    $CX_{ij}$ (    $CY_{ij}$

※    $W_{ij}$

I= 22   REFRACTIVE INDEX: 1.50
J= 22
K= 11   B YKL= 0.0000
L= 12   ZKL  = 0.00

|  |  |  |  |  |  | x i | -50.0 | -45.0 | -40.0 | -35.0 |
|---|---|---|---|---|---|---|---|---|---|---|
|  |  |  |  |  |  | i | 0 | 1 | 2 | 3 |
| Yj | D Y Kj | B X Kj | j | I jmin | I jmax |  |  |  |  |  |
| 50.0 | ###### | ######## | 22 | ##### | ##### | ###### | ###### | ###### | ###### | ###### |
| 45.0 | 4.96 | 0.0000 | 21 | 11 | 11 | ###### | ###### | ###### | ###### | ###### |
| 40.0 | 4.96 | 0.0000 | 20 | 6 | 16 | ###### | ###### | ###### | ###### | ###### |
| 35.0 | 4.96 | 0.0000 | 19 | 5 | 17 | ###### | ###### | ###### | ###### | ###### |
| 30.0 | 4.96 | 0.0000 | 18 | 4 | 18 | ###### | ###### | ###### | ###### | ###### |
| 25.0 | 4.96 | 0.0000 | 17 | 3 | 19 | ###### | ###### | ###### | ###### | 5.22 |
| 20.0 | 4.96 | 0.0000 | 16 | 2 | 20 | ###### | ###### | ###### | 5.09 | 5.14 |
| 15.0 | 4.96 | 0.0000 | 15 | 2 | 20 | ###### | ###### | ###### | 4.98 | 5.11 |
| 10.0 | 4.96 | 0.0000 | 14 | 2 | 20 | ###### | ###### | ###### | 5.02 | 5.06 |
| 5.0 | 4.96 | 0.0000 | 13 | 2 | 20 | ###### | ###### | ###### | 5.22 | 5.00 |
| 0.0 | 5.18 | 0.0000 | 12 | 1 | 21 | ###### | ###### | 5.67 | 5.30 | 5.13 |
| -3.0 | 5.50 | -0.0007 | 11 | 2 | 20 | ###### | ###### | ###### | 5.42 | 5.21 |
| -6.0 | 5.97 | -0.0011 | 10 | 2 | 20 | ###### | ###### | ###### | 5.49 | 5.23 |
| -9.0 | 6.40 | -0.0024 | 9 | 2 | 20 | ###### | ###### | ###### | 5.56 | 5.19 |
| -12.0 | 6.70 | -0.0046 | 8 | 2 | 20 | ###### | ###### | ###### | 5.54 | 5.30 |
| -15.0 | 6.96 | -0.0055 | 7 | 2 | 20 | ###### | ###### | ###### | 5.58 | 5.40 |
| -20.0 | 7.02 | -0.0056 | 6 | 2 | 20 | ###### | ###### | ###### | 5.70 | 5.42 |
| -25.0 | 7.02 | -0.0056 | 5 | 3 | 19 | ###### | ###### | ###### | ###### | 5.13 |
| -30.0 | 7.02 | -0.0056 | 4 | 4 | 18 | ###### | ###### | ###### | ###### | ###### |
| -35.0 | 7.02 | -0.0056 | 3 | 5 | 17 | ###### | ###### | ###### | ###### | ###### |
| -40.0 | 7.02 | -0.0056 | 2 | 6 | 16 | ###### | ###### | ###### | ###### | ###### |
| -45.0 | 7.02 | -0.0056 | 1 | 11 | 11 | ###### | ###### | ###### | ###### | ###### |
| -50.0 | ###### | ######## | 0 | ##### | ##### | ###### | ###### | ###### | ###### | ###### |

| -30.0 | -25.0 | -20.0 | -15.0 | -10.0 | -6.0 | -3.0 | 0.0 | 3.0 | 6.0 | 10.0 |
|---|---|---|---|---|---|---|---|---|---|---|
| 4 | 5 | 6 | 7 | 8 | 9 | 10 | 11 | 12 | 13 | 14 |

DXij

| ###### | ###### | ###### | ###### | ###### | ###### | ###### | ###### | ###### | ###### | ###### |
|---|---|---|---|---|---|---|---|---|---|---|
| ###### | ###### | ###### | ###### | ###### | ###### | ###### | 5.54 | ###### | ###### | ###### |
| ###### | ###### | 5.37 | 5.40 | 5.40 | 5.40 | 5.40 | 5.40 | 5.40 | 5.40 | 5.40 |
| ###### | 5.36 | 5.21 | 5.29 | 5.29 | 5.29 | 5.29 | 5.29 | 5.29 | 5.29 | 5.29 |
| 5.33 | 5.29 | 5.18 | 5.19 | 5.19 | 5.19 | 5.19 | 5.19 | 5.19 | 5.19 | 5.19 |
| 5.29 | 5.27 | 5.14 | 5.12 | 5.12 | 5.12 | 5.12 | 5.12 | 5.12 | 5.12 | 5.12 |
| 5.22 | 5.24 | 5.17 | 5.09 | 5.06 | 5.06 | 5.06 | 5.06 | 5.06 | 5.06 | 5.06 |
| 5.17 | 5.24 | 5.07 | 5.25 | 4.98 | 5.02 | 5.01 | 5.01 | 5.01 | 5.02 | 4.98 |
| 5.20 | 5.15 | 5.11 | 5.23 | 5.05 | 4.99 | 4.98 | 4.98 | 4.98 | 4.99 | 5.05 |
| 5.18 | 5.08 | 5.13 | 5.19 | 5.17 | 5.03 | 4.98 | 4.97 | 4.98 | 5.03 | 5.17 |
| 5.06 | 4.98 | 5.06 | 5.18 | 5.18 | 5.20 | 5.18 | 5.18 | 5.18 | 5.20 | 5.18 |
| 4.94 | 4.95 | 5.01 | 5.10 | 5.10 | 5.33 | 5.38 | 5.52 | 5.44 | 5.44 | 5.23 |
| 4.88 | 4.90 | 4.94 | 5.02 | 4.96 | 5.41 | 5.82 | 5.99 | 5.71 | 5.77 | 5.17 |
| 4.93 | 4.82 | 4.88 | 4.87 | 4.92 | 5.53 | 6.15 | 6.36 | 6.24 | 6.09 | 5.22 |
| 4.88 | 4.83 | 4.74 | 4.70 | 5.11 | 5.57 | 6.35 | 6.63 | 6.98 | 6.29 | 5.45 |
| 4.83 | 4.83 | 4.57 | 4.66 | 5.28 | 5.65 | 6.59 | 6.95 | 7.16 | 6.78 | 5.53 |
| 4.78 | 4.62 | 4.67 | 4.71 | 5.50 | 6.24 | 6.83 | 7.15 | 7.27 | 7.11 | 5.98 |
| 4.84 | 4.79 | 4.74 | 4.95 | 5.72 | 6.67 | 6.99 | 7.31 | 7.43 | 7.27 | 6.29 |
| 5.06 | 5.00 | 4.86 | 5.22 | 5.94 | 6.83 | 7.27 | 7.53 | 7.65 | 7.49 | 6.46 |
| ###### | 5.31 | 5.15 | 5.35 | 6.09 | 7.21 | 7.45 | 7.82 | 7.94 | 7.78 | 6.66 |
| ###### | ###### | 5.35 | 5.66 | 6.32 | 7.36 | 7.74 | 8.20 | 8.32 | 8.16 | 6.88 |
| ###### | ###### | ###### | ###### | ###### | ###### | ###### | 8.72 | ###### | ###### | ###### |
| ###### | ###### | ###### | ###### | ###### | ###### | ###### | ###### | ###### | ###### | ###### |

FIG. 7B

| 15.0 | 20.0 | 25.0 | 30.0 | 35.0 | 40.0 | 45.0 | 50.0 |
|---|---|---|---|---|---|---|---|
| 15 | 16 | 17 | 18 | 19 | 20 | 21 | 22 |

| | | | | | | | |
|---|---|---|---|---|---|---|---|
| ###### | ###### | ###### | ###### | ###### | ###### | ###### | ###### |
| ###### | ###### | ###### | ###### | ###### | ###### | ###### | ###### |
| 5.40 | 5.37 | ###### | ###### | ###### | ###### | ###### | ###### |
| 5.29 | 5.21 | 5.36 | ###### | ###### | ###### | ###### | ###### |
| 5.19 | 5.18 | 5.29 | 5.33 | ###### | ###### | ###### | ###### |
| 5.12 | 5.14 | 5.27 | 5.29 | 5.22 | ###### | ###### | ###### |
| 5.09 | 5.17 | 5.24 | 5.22 | 5.14 | 5.09 | ###### | ###### |
| 5.25 | 5.07 | 5.24 | 5.17 | 5.11 | 4.98 | ###### | ###### |
| 5.23 | 5.11 | 5.15 | 5.20 | 5.06 | 5.02 | ###### | ###### |
| 5.19 | 5.13 | 5.08 | 5.18 | 5.00 | 5.22 | ###### | ###### |
| 5.18 | 5.06 | 4.98 | 5.06 | 5.13 | 5.30 | 5.67 | ###### |
| 5.02 | 5.03 | 4.95 | 4.94 | 5.21 | 5.42 | ###### | ###### |
| 4.97 | 4.93 | 4.90 | 4.88 | 5.23 | 5.49 | ###### | ###### |
| 4.79 | 4.89 | 4.82 | 4.93 | 5.19 | 5.56 | ###### | ###### |
| 4.60 | 4.78 | 4.83 | 4.88 | 5.30 | 5.54 | ###### | ###### |
| 4.72 | 4.57 | 4.83 | 4.83 | 5.40 | 5.58 | ###### | ###### |
| 4.92 | 4.68 | 4.62 | 4.78 | 5.42 | 5.70 | ###### | ###### |
| 5.22 | 4.87 | 4.79 | 4.84 | 5.13 | ###### | ###### | ###### |
| 5.60 | 4.96 | 5.00 | 5.06 | ###### | ###### | ###### | ###### |
| 5.79 | 5.13 | 5.31 | ###### | ###### | ###### | ###### | ###### |
| 5.79 | 5.45 | ###### | ###### | ###### | ###### | ###### | ###### |
| ###### | ###### | ###### | ###### | ###### | ###### | ###### | ###### |
| ###### | ###### | ###### | ###### | ###### | ###### | ###### | ###### |

FIG. 7C

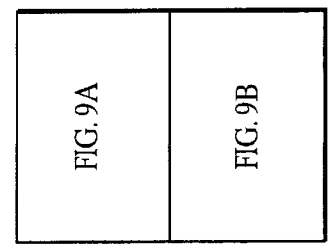
FIG. 9
FIG. 9A

FIG. 9B

| | | | | | | | | | | | | | | |
|---|---|---|---|---|---|---|---|---|---|---|---|---|---|---|
| -2 | 5.37 | -0.0005 | 24 | 3 | 47 | 5.67 | 5.54 | 5.37 | 5.27 | 5.22 | 5.15 | 5.06 | 4.98 | 4.95 | 4.95 | 4.96 |
| -4 | 5.64 | -0.0008 | 23 | 3 | 47 | 5.71 | 5.60 | 5.44 | 5.34 | 5.28 | 5.16 | 5.02 | 4.90 | 4.88 | 4.92 | 4.95 |
| -6 | 5.97 | -0.0011 | 22 | 3 | 47 | 5.78 | 5.66 | 5.49 | 5.37 | 5.29 | 5.16 | 4.99 | 4.87 | 4.85 | 4.88 | 4.91 |
| -8 | 6.28 | -0.0018 | 21 | 3 | 47 | 5.81 | 5.72 | 5.54 | 5.39 | 5.25 | 5.12 | 5.00 | 4.91 | 4.86 | 4.84 | 4.84 |
| -10 | 6.52 | -0.0031 | 20 | 4 | 46 | ### | 5.74 | 5.55 | 5.40 | 5.27 | 5.14 | 5.02 | 4.92 | 4.84 | 4.81 | 4.81 |
| -12 | 6.69 | -0.0046 | 19 | 4 | 46 | ### | 5.74 | 5.53 | 5.42 | 5.35 | 5.22 | 5.03 | 4.87 | 4.82 | 4.83 | 4.82 |
| -14 | 6.90 | -0.0053 | 18 | 4 | 46 | ### | 5.74 | 5.55 | 5.47 | 5.43 | 5.28 | 5.03 | 4.83 | 4.80 | 4.84 | 4.83 |
| -16 | 7.02 | -0.0056 | 17 | 4 | 46 | ### | 5.74 | 5.60 | 5.55 | 5.50 | 5.32 | 5.03 | 4.80 | 4.75 | 4.80 | 4.77 |
| -18 | 7.03 | -0.0057 | 16 | 5 | 45 | ### | ### | 5.66 | 5.61 | 5.53 | 5.34 | 5.03 | 4.78 | 4.69 | 4.68 | 4.69 |
| -20 | 7.01 | -0.0056 | 15 | 5 | 45 | ### | ### | 5.69 | 5.62 | 5.51 | 5.30 | 5.02 | 4.77 | 4.65 | 4.61 | 4.63 |
| -22 | 7.01 | -0.0056 | 14 | 6 | 44 | ### | ### | ### | 5.54 | 5.41 | 5.21 | 4.97 | 4.77 | 4.67 | 4.64 | 4.66 |
| -24 | 7.01 | -0.0056 | 13 | 6 | 44 | ### | ### | ### | 5.42 | 5.27 | 5.10 | 4.93 | 4.80 | 4.74 | 4.74 | 4.74 |
| -26 | 7.01 | -0.0056 | 12 | 7 | 43 | ### | ### | ### | 5.14 | 5.03 | 5.01 | 4.94 | 4.88 | 4.86 | 4.84 | 4.81 |
| -28 | 7.01 | -0.0056 | 11 | 8 | 42 | ### | ### | ### | ### | 5.01 | ### | 4.99 | 4.99 | 4.97 | 4.93 | 4.87 |
| -30 | 7.01 | -0.0056 | 10 | 9 | 41 | ### | ### | ### | ### | ### | ### | 5.04 | 5.06 | 5.06 | 5.03 | 4.96 |
| -32 | 7.01 | -0.0056 | 9 | 10 | 40 | ### | ### | ### | ### | ### | ### | ### | 5.04 | 5.09 | 5.14 | 5.10 |
| -34 | 7.01 | -0.0056 | 8 | 11 | 39 | ### | ### | ### | ### | ### | ### | ### | ### | 5.13 | 5.25 | 5.25 |
| -36 | 7.01 | -0.0056 | 7 | 12 | 38 | ### | ### | ### | ### | ### | ### | ### | ### | ### | 5.25 | 5.34 |
| -38 | 7.01 | -0.0056 | 6 | 13 | 37 | ### | ### | ### | ### | ### | ### | ### | ### | 5.33 | 5.33 | 5.36 |
| -40 | 7.01 | -0.0056 | 5 | 15 | 35 | ### | ### | ### | ### | ### | ### | ### | ### | ### | ### | ### |
| -42 | 7.01 | -0.0056 | 4 | 17 | 33 | ### | ### | ### | ### | ### | ### | ### | ### | ### | ### | ### |
| -44 | 7.01 | -0.0056 | 3 | 21 | 29 | ### | ### | ### | ### | ### | ### | ### | ### | ### | ### | ### |

FIG. 10

| FIG. 10A |
| FIG. 10B |

FIG. 10A

| Xm | -22 | -20 | -18 | -16 | -14 | -12 | -10 | -8 | -6 | -4 | -2 | 0 | 2 | 4 | 6 | 8 | 10 |
|---|---|---|---|---|---|---|---|---|---|---|---|---|---|---|---|---|---|
| m | 14 | 15 | 16 | 17 | 18 | 19 | 20 | 21 | 22 | 23 | 24 | 25 | 26 | 27 | 28 | 29 | 30 |
| n | | | | | | | DXmn | | | | | | | | | | |
| 47 | ### | ### | ### | ### | ### | ### | ### | 5.51 | 5.51 | 5.51 | 5.51 | 5.51 | 5.51 | 5.51 | 5.51 | 5.51 | ### |
| 46 | ### | ### | ### | ### | ### | ### | 5.45 | 5.45 | 5.45 | 5.45 | 5.45 | 5.45 | 5.45 | 5.45 | 5.45 | 5.45 | 5.45 |
| 45 | ### | 5.37 | 5.38 | 5.39 | 5.40 | 5.40 | 5.40 | 5.40 | 5.40 | 5.40 | 5.40 | 5.40 | 5.40 | 5.40 | 5.40 | 5.40 | 5.40 |
| 44 | 5.31 | 5.29 | 5.31 | 5.34 | 5.36 | 5.36 | 5.35 | 5.35 | 5.35 | 5.36 | 5.35 | 5.36 | 5.35 | 5.36 | 5.35 | 5.35 | 5.35 |
| 43 | 5.27 | 5.23 | 5.25 | 5.29 | 5.32 | 5.32 | 5.31 | 5.31 | 5.31 | 5.31 | 5.31 | 5.31 | 5.31 | 5.31 | 5.31 | 5.31 | 5.31 |
| 42 | 5.24 | 5.19 | 5.21 | 5.25 | 5.28 | 5.28 | 5.27 | 5.26 | 5.27 | 5.27 | 5.27 | 5.27 | 5.27 | 5.27 | 5.27 | 5.26 | 5.27 |
| 41 | 5.23 | 5.18 | 5.19 | 5.22 | 5.23 | 5.23 | 5.23 | 5.22 | 5.23 | 5.23 | 5.23 | 5.23 | 5.23 | 5.23 | 5.22 | 5.22 | 5.23 |
| 40 | 5.22 | 5.18 | 5.17 | 5.18 | 5.20 | 5.19 | 5.19 | 5.19 | 5.19 | 5.19 | 5.19 | 5.19 | 5.19 | 5.19 | 5.19 | 5.19 | 5.19 |
| 39 | 5.20 | 5.16 | 5.15 | 5.16 | 5.16 | 5.16 | 5.16 | 5.16 | 5.16 | 5.16 | 5.16 | 5.16 | 5.16 | 5.16 | 5.16 | 5.16 | 5.16 |
| 38 | 5.19 | 5.14 | 5.13 | 5.13 | 5.14 | 5.13 | 5.13 | 5.13 | 5.13 | 5.13 | 5.13 | 5.13 | 5.13 | 5.13 | 5.13 | 5.13 | 5.13 |
| 37 | 5.19 | 5.15 | 5.12 | 5.10 | 5.10 | 5.10 | 5.11 | 5.11 | 5.11 | 5.11 | 5.11 | 5.11 | 5.11 | 5.11 | 5.11 | 5.11 | 5.11 |
| 36 | 5.21 | 5.17 | 5.13 | 5.09 | 5.07 | 5.08 | 5.09 | 5.08 | 5.08 | 5.08 | 5.08 | 5.08 | 5.08 | 5.08 | 5.08 | 5.08 | 5.09 |
| 35 | 5.21 | 5.17 | 5.14 | 5.10 | 5.08 | 5.07 | 5.06 | 5.06 | 5.06 | 5.06 | 5.06 | 5.06 | 5.06 | 5.06 | 5.06 | 5.06 | 5.06 |
| 34 | 5.17 | 5.13 | 5.14 | 5.16 | 5.14 | 5.07 | 5.01 | 5.02 | 5.04 | 5.04 | 5.04 | 5.04 | 5.04 | 5.04 | 5.04 | 5.02 | 5.01 |
| 33 | 5.13 | 5.08 | 5.14 | 5.23 | 5.21 | 5.08 | 4.97 | 4.99 | 5.03 | 5.02 | 5.00 | 5.02 | 5.01 | 5.03 | 5.03 | 4.99 | 4.98 |
| 32 | 5.09 | 5.06 | 5.15 | 5.26 | 5.25 | 5.09 | 4.97 | 4.97 | 5.02 | 5.00 | 4.99 | 5.01 | 5.00 | 5.01 | 5.02 | 4.97 | 4.97 |
| 31 | 5.09 | 5.07 | 5.16 | 5.25 | 5.24 | 5.11 | 5.00 | 4.98 | 5.00 | 5.00 | 4.98 | 4.99 | 4.99 | 5.00 | 5.00 | 4.98 | 4.99 |
| 30 | 5.09 | 5.10 | 5.17 | 5.22 | 5.20 | 5.13 | 5.05 | 5.00 | 4.99 | 5.00 | 4.96 | 4.98 | 4.98 | 4.98 | 4.99 | 5.00 | 5.05 |
| 29 | 5.10 | 5.12 | 5.17 | 5.20 | 5.19 | 5.16 | 5.10 | 5.04 | 4.99 | 4.98 | 4.96 | 4.97 | 4.97 | 4.97 | 4.99 | 5.05 | 5.11 |
| 28 | 5.09 | 5.13 | 5.16 | 5.18 | 5.20 | 5.18 | 5.15 | 5.09 | 5.01 | 4.97 | 4.99 | 4.98 | 4.98 | 5.00 | 5.02 | 5.09 | 5.16 |
| 27 | 5.08 | 5.12 | 5.15 | 5.18 | 5.20 | 5.21 | 5.18 | 5.12 | 5.05 | 5.01 | 5.07 | 5.05 | 5.05 | 5.07 | 5.05 | 5.12 | 5.17 |
| 26 | 5.04 | 5.09 | 5.14 | 5.18 | 5.20 | 5.21 | 5.19 | 5.15 | 5.11 | 5.10 | 5.18 | 5.18 | 5.18 | 5.19 | 5.10 | 5.13 | 5.17 |
| 25 | 5.01 | 5.06 | 5.12 | 5.16 | 5.19 | 5.18 | 5.18 | 5.19 | 5.20 | 5.19 | 5.18 | 5.18 | 5.18 | 5.19 | 5.20 | 5.19 | 5.18 |

FIG. 10B

| | | | | | | | | | | | | | | | | |
|---|---|---|---|---|---|---|---|---|---|---|---|---|---|---|---|---|
| 24 | 4.99 | 5.02 | 5.08 | 5.12 | 5.13 | 5.11 | 5.13 | 5.23 | 5.30 | 5.28 | 5.31 | 5.40 | 5.35 | 5.35 | 5.30 | 5.23 |
| 23 | 4.96 | 4.98 | 5.03 | 5.08 | 5.07 | 5.03 | 5.05 | 5.20 | 5.37 | 5.45 | 5.59 | 5.70 | 5.51 | 5.56 | 5.42 | 5.22 |
| 22 | 4.91 | 4.94 | 4.99 | 5.03 | 5.00 | 4.93 | 4.95 | 5.13 | 5.41 | 5.70 | 5.95 | 6.02 | 5.70 | 5.80 | 5.53 | 5.16 |
| 21 | 4.87 | 4.91 | 4.94 | 4.95 | 4.91 | 4.85 | 4.89 | 5.12 | 5.49 | 5.90 | 6.21 | 6.28 | 6.01 | 6.04 | 5.65 | 5.16 |
| 20 | 4.84 | 4.85 | 4.84 | 4.82 | 4.81 | 4.84 | 4.96 | 5.17 | 5.54 | 6.04 | 6.36 | 6.45 | 6.46 | 6.16 | 4.73 | 5.29 |
| 19 | 4.80 | 4.74 | 4.68 | 4.66 | 4.75 | 4.93 | 5.11 | 5.24 | 5.54 | 6.15 | 6.50 | 6.60 | 6.89 | 6.28 | 5.82 | 5.46 |
| 18 | 4.72 | 4.61 | 4.55 | 4.58 | 4.76 | 5.03 | 5.25 | 5.31 | 5.56 | 6.25 | 6.71 | 6.83 | 7.10 | 6.62 | 6.05 | 5.49 |
| 17 | 4.66 | 4.55 | 4.50 | 4.56 | 4.78 | 5.09 | 5.34 | 5.44 | 5.69 | 6.38 | 6.88 | 7.02 | 7.18 | 6.94 | 6.29 | 5.57 |
| 16 | 4.65 | 4.60 | 4.55 | 4.58 | 4.78 | 5.11 | 5.43 | 5.64 | 5.95 | 6.52 | 6.96 | 7.11 | 7.24 | 7.09 | 6.48 | 5.75 |
| 15 | 4.66 | 4.67 | 4.63 | 4.64 | 4.80 | 5.12 | 5.50 | 5.86 | 6.23 | 6.66 | 6.98 | 7.15 | 7.29 | 7.14 | 6.63 | 5.97 |
| 14 | 4.69 | 4.71 | 4.70 | 4.72 | 4.87 | 5.17 | 5.58 | 6.05 | 6.47 | 6.77 | 7.01 | 7.21 | 7.34 | 7.19 | 6.74 | 6.13 |
| 13 | 4.73 | 4.73 | 4.75 | 4.81 | 4.98 | 5.25 | 5.66 | 6.19 | 6.64 | 6.86 | 7.05 | 7.28 | 7.40 | 7.26 | 6.82 | 6.25 |
| 12 | 4.76 | 4.75 | 4.80 | 4.92 | 5.11 | 5.37 | 5.76 | 6.27 | 6.72 | 6.95 | 7.14 | 7.36 | 7.48 | 7.34 | 6.89 | 6.33 |
| 11 | 4.80 | 4.79 | 4.87 | 5.03 | 5.23 | 5.49 | 5.85 | 6.32 | 6.76 | 7.05 | 7.26 | 7.44 | 7.57 | 7.42 | 6.96 | 6.39 |
| 10 | 4.88 | 4.86 | 4.94 | 5.11 | 5.32 | 5.58 | 5.93 | 6.39 | 6.84 | 7.16 | 7.38 | 7.53 | 7.66 | 7.52 | 7.03 | 4.45 |
| 9 | 5.01 | 4.96 | 5.02 | 5.18 | 5.37 | 5.61 | 5.98 | 6.51 | 6.99 | 7.25 | 7.45 | 7.65 | 7.74 | 7.63 | 7.11 | 6.51 |
| 8 | 5.16 | 5.08 | 5.12 | 5.24 | 5.41 | 5.63 | 6.03 | 6.64 | 7.17 | 7.34 | 7.51 | 7.77 | 7.86 | 7.75 | 7.22 | 6.59 |
| 7 | 5.26 | 5.19 | 5.21 | 5.31 | 5.46 | 5.70 | 6.11 | 6.75 | 7.28 | 7.43 | 7.61 | 7.89 | 8.00 | 7.88 | 7.35 | 6.71 |
| 6 | 5.31 | 5.28 | 5.32 | 5.42 | 5.57 | 5.81 | 6.22 | 6.82 | 7.33 | 7.53 | 7.74 | 8.03 | 8.17 | 8.02 | 7.49 | 6.83 |
| 5 | ### | 5.34 | 5.43 | 5.58 | 5.74 | 5.94 | 6.30 | 6.86 | 7.38 | 7.61 | 7.88 | 8.22 | 8.33 | 8.20 | 7.61 | 6.87 |
| 4 | ### | ### | ### | 5.79 | 5.94 | 6.04 | 6.32 | 6.92 | 7.48 | 7.66 | 8.00 | 8.46 | 8.53 | 8.43 | 7.68 | 6.77 |
| 3 | ### | ### | ### | ### | ### | ### | ### | 6.98 | 7.63 | 7.76 | 8.11 | 8.69 | 8.75 | 8.65 | 7.76 | ### |

| Xm | 12 | 14 | 16 | 18 | 20 | 22 | 24 | 26 | 28 | 30 | 32 | 34 | 36 | 38 | 40 | 42 | 44 |
|---|---|---|---|---|---|---|---|---|---|---|---|---|---|---|---|---|---|
| m | 31 | 32 | 33 | 34 | 35 | 36 | 37 | 38 | 39 | 40 | 41 | 42 | 43 | 44 | 45 | 46 | 47 |
| n | | | | | | | | DX mn | | | | | | | | | |
| 47 | ### | ### | ### | ### | ### | ### | ### | ### | ### | ### | ### | ### | ### | ### | ### | ### | ### |
| 46 | 5.45 | 5.45 | ### | ### | ### | ### | ### | ### | ### | ### | ### | ### | ### | ### | ### | ### | ### |
| 45 | 5.40 | 5.40 | 5.45 | 5.38 | 5.37 | ### | ### | ### | ### | ### | ### | ### | ### | ### | ### | ### | ### |
| 44 | 5.36 | 5.36 | 5.39 | 5.31 | 5.29 | 5.31 | 5.36 | ### | ### | ### | ### | ### | ### | ### | ### | ### | ### |
| 43 | 5.32 | 5.32 | 5.34 | 5.25 | 5.23 | 5.27 | 5.34 | 5.40 | ### | ### | ### | ### | ### | ### | ### | ### | ### |
| 42 | 5.28 | 5.28 | 5.29 | 5.21 | 5.19 | 5.24 | 5.31 | 5.37 | 5.39 | ### | ### | ### | ### | ### | ### | ### | ### |
| 41 | 5.23 | 5.23 | 5.25 | 5.19 | 5.18 | 5.23 | 5.29 | 5.34 | 5.35 | 5.36 | ### | ### | ### | ### | ### | ### | ### |
| 40 | 5.19 | 5.20 | 5.21 | 5.17 | 5.18 | 5.22 | 5.28 | 5.31 | 5.32 | 5.33 | 5.35 | ### | ### | ### | ### | ### | ### |
| 39 | 5.16 | 5.16 | 5.18 | 5.15 | 5.16 | 5.20 | 5.26 | 5.30 | 5.31 | 5.31 | 5.32 | 5.32 | ### | ### | ### | ### | ### |
| 38 | 5.13 | 5.14 | 5.16 | 5.13 | 5.14 | 5.19 | 5.25 | 5.29 | 5.30 | 5.30 | 5.29 | 5.27 | 5.22 | ### | ### | ### | ### |
| 37 | 5.10 | 5.10 | 5.13 | 5.12 | 5.15 | 5.19 | 5.24 | 5.28 | 5.29 | 5.28 | 5.26 | 5.22 | 5.18 | 5.14 | ### | ### | ### |
| 36 | 5.08 | 5.07 | 5.09 | 5.13 | 5.17 | 5.21 | 5.23 | 5.26 | 5.27 | 5.26 | 5.22 | 5.18 | 5.15 | 5.14 | 5.09 | ### | ### |
| 35 | 5.07 | 5.08 | 5.10 | 5.14 | 5.17 | 5.21 | 5.23 | 5.25 | 5.24 | 5.22 | 5.19 | 5.15 | 5.13 | 5.11 | 5.04 | ### | ### |
| 34 | 5.07 | 5.13 | 5.16 | 5.14 | 5.13 | 5.13 | 5.23 | 5.26 | 5.23 | 5.19 | 5.16 | 5.14 | 5.11 | 5.07 | 4.99 | ### | ### |
| 33 | 5.08 | 5.21 | 5.23 | 5.15 | 5.08 | 5.22 | 5.22 | 5.24 | 5.22 | 5.17 | 5.15 | 5.14 | 5.09 | 5.01 | 4.95 | ### | ### |
| 32 | 5.09 | 5.25 | 5.26 | 5.16 | 5.06 | 5.13 | 5.19 | 5.21 | 5.21 | 5.17 | 5.15 | 5.13 | 5.07 | 4.97 | 4.96 | ### | ### |
| 31 | 5.11 | 5.24 | 5.25 | 5.17 | 5.07 | 5.09 | 5.16 | 5.20 | 5.20 | 5.18 | 5.16 | 5.10 | 5.05 | 4.96 | 5.00 | 5.06 | 5.39 |
| 30 | 5.13 | 5.22 | 5.22 | 5.17 | 5.10 | 5.09 | 5.13 | 5.19 | 5.19 | 5.20 | 5.16 | 5.06 | 5.02 | 4.97 | 5.09 | 5.08 | 5.47 |
| 29 | 5.16 | 5.20 | 5.19 | 5.16 | 5.12 | 5.10 | 5.10 | 5.16 | 5.18 | 5.19 | 5.14 | 5.02 | 5.00 | 5.01 | 5.18 | 5.11 | 5.56 |
| 28 | 5.19 | 5.19 | 5.18 | 5.16 | 5.13 | 5.10 | 5.08 | 5.11 | 5.14 | 5.17 | 5.12 | 5.03 | 4.98 | 5.05 | 5.23 | 5.16 | 5.63 |
| 27 | 5.20 | 5.21 | 5.19 | 5.15 | 5.12 | 5.07 | 5.05 | 5.08 | 5.09 | 5.13 | 5.11 | 5.07 | 5.01 | 5.08 | 5.25 | 5.25 | 5.35 |
| 26 | 5.20 | 5.22 | 5.20 | 5.15 | 5.08 | 5.03 | 5.01 | 5.04 | 5.02 | 5.06 | 5.10 | 5.07 | 5.06 | 5.12 | 5.29 | 5.35 | 5.43 |
| 25 | 5.18 | 5.19 | 5.16 | 5.12 | 5.06 | 5.01 | 4.98 | 4.99 | 5.02 | 5.06 | 5.10 | 5.12 | 4.14 | 5.18 | 5.29 | 5.47 | 5.68 |

FIG. 11B

| 24 | 5.15 | 5.08 | 5.05 | 5.05 | 5.05 | 5.02 | 4.97 | 4.94 | 4.94 | 4.98 | 5.06 | 5.15 | 5.22 | 5.27 | 5.37 | 5.54 | 5.68 |
|---|---|---|---|---|---|---|---|---|---|---|---|---|---|---|---|---|---|
| 23 | 5.08 | 5.01 | 4.99 | 4.99 | 5.00 | 4.98 | 4.95 | 4.91 | 4.88 | 4.90 | 5.01 | 5.17 | 5.28 | 5.34 | 5.44 | 5.60 | 5.71 |
| 22 | 4.99 | 4.97 | 4.97 | 4.95 | 4.93 | 4.92 | 4.91 | 4.88 | 4.85 | 4.87 | 4.99 | 5.16 | 5.29 | 5.37 | 5.49 | 5.66 | 5.78 |
| 21 | 4.91 | 4.86 | 4.88 | 4.90 | 4.90 | 4.88 | 4.85 | 4.85 | 4.85 | 4.91 | 5.00 | 5.12 | 5.25 | 5.39 | 5.54 | 5.72 | 5.81 |
| 20 | 4.95 | 4.74 | 4.70 | 4.79 | 4.87 | 4.87 | 4.82 | 4.84 | 4.84 | 4.92 | 5.02 | 5.15 | 5.27 | 5.40 | 5.55 | 5.75 | ### |
| 19 | 5.04 | 4.68 | 4.55 | 4.64 | 4.79 | 4.85 | 4.84 | 4.81 | 4.81 | 4.87 | 5.03 | 5.22 | 5.35 | 5.42 | 5.53 | 5.74 | ### |
| 18 | 5.05 | 4.75 | 4.59 | 4.56 | 4.63 | 4.73 | 4.83 | 4.83 | 4.79 | 4.83 | 5.03 | 5.28 | 5.43 | 5.48 | 5.55 | 5.74 | ### |
| 17 | 5.10 | 4.85 | 4.69 | 4.56 | 4.54 | 4.64 | 4.76 | 4.80 | 4.76 | 4.80 | 5.03 | 5.32 | 5.50 | 5.55 | 5.60 | 5.74 | ### |
| 16 | 5.25 | 4.95 | 4.75 | 4.63 | 4.58 | 4.61 | 4.68 | 4.70 | 4.69 | 4.78 | 5.03 | 5.33 | 5.54 | 5.61 | 5.66 | ### | ### |
| 15 | 5.42 | 5.04 | 4.81 | 4.72 | 4.68 | 4.65 | 4.63 | 4.62 | 4.65 | 4.77 | 5.02 | 5.30 | 5.51 | 5.62 | 5.69 | ### | ### |
| 14 | 5.58 | 5.15 | 4.90 | 4.81 | 4.77 | 4.72 | 4.67 | 4.64 | 4.66 | 4.77 | 4.98 | 5.21 | 5.41 | 5.54 | ### | ### | ### |
| 13 | 5.71 | 5.29 | 5.02 | 4.90 | 4.84 | 4.80 | 4.75 | 4.73 | 4.74 | 4.80 | 4.93 | 5.10 | 5.27 | 5.42 | ### | ### | ### |
| 12 | 5.83 | 5.44 | 5.16 | 4.99 | 4.89 | 4.84 | 4.83 | 4.83 | 4.85 | 4.88 | 4.94 | 5.03 | 5.14 | ### | ### | ### | ### |
| 11 | 5.94 | 5.60 | 5.31 | 5.08 | 4.92 | 4.87 | 4.88 | 4.92 | 4.97 | 4.99 | 5.00 | 5.01 | ### | ### | ### | ### | ### |
| 10 | 6.04 | 5.75 | 5.45 | 5.16 | 4.95 | 4.91 | 4.96 | 5.02 | 5.06 | 5.06 | 5.04 | ### | ### | ### | ### | ### | ### |
| 9 | 6.12 | 5.86 | 5.56 | 5.22 | 4.99 | 4.99 | 5.09 | 5.14 | 5.10 | 5.04 | ### | ### | ### | ### | ### | ### | ### |
| 8 | 6.19 | 5.93 | 5.62 | 5.28 | 5.06 | 5.10 | 5.24 | 5.26 | 5.14 | ### | ### | ### | ### | ### | ### | ### | ### |
| 7 | 6.25 | 5.93 | 5.63 | 5.34 | 5.17 | 5.21 | 5.32 | 5.34 | ### | ### | ### | ### | ### | ### | ### | ### | ### |
| 6 | 6.30 | 5.91 | 5.62 | 5.42 | 5.32 | 5.31 | 5.36 | ### | ### | ### | ### | ### | ### | ### | ### | ### | ### |
| 5 | 6.30 | 5.92 | 5.67 | 5.52 | 5.45 | ### | ### | ### | ### | ### | ### | ### | ### | ### | ### | ### | ### |
| 4 | 6.24 | 5.99 | 5.82 | ### | ### | ### | ### | ### | ### | ### | ### | ### | ### | ### | ### | ### | ### |
| 3 | ### | ### | ### | ### | ### | ### | ### | ### | ### | ### | ### | ### | ### | ### | ### | ### | ### |

- • : $Z{\sim}mn$
- — : $BX{\sim}mn$
- | : $BY{\sim}mn$
- ⌢ : $CX{\sim}mn$
- ( : $CY{\sim}mn$
- ※ : $W{\sim}mn$

SURFACE ASTIGMATISM

AVERAGE SURFACE
REFRACTIVE POWER

6,366,823 B1

DESIGN METHOD FOR OPTICAL CURVED SURFACE

BACKGROUND OF THE INVENTION

The present invention relates to a design method for a non-rotationally symmetrical optical curved surface such as a progressive power lens or an fθ lens.

In general, an aspherical surface, particularly a complex aspherical surface, is designed after repeated trial and error. An optical performance of a default shape is evaluated, then at least one parameter of the shape is changed and the performance is evaluated. The change of the parameter and the evaluation are repeated until a satisfactory result is obtained.

An aspherical surface can be represented by a mathematical function. In a first conventional method, the entire area of the aspherical surface is represented by a high-order polynomial. A second conventional method divides the aspherical surface into a plurality of areas and a low-order polynomial is defined for each of the areas. In the first method, since the change of the parameter to improve performance of the specific area influences the performance of the entire area, the first method increases number of times of the trial and error to optimize the entire area with considering the influence.

In the second method, since the change of the parameter of the specific area has no influence with the other area, it eases to improve the local optical performance and it is suited for designing the complex aspherical surface. A lens design method using the second method is disclosed in, for example, Japanese Provisional Patent Publication No. Sho 55-146412, or International Patent Re-publication WO 96/11421.

Sho 55-146412 discloses a design method for an aspherical surface of a progressive power spectacle lens. The disclosed method divides the entire area of the aspherical surface into rectangular areas that are divisions divided by a lattice. Each of the rectangular areas is represented by a bicubic polynomial function and coefficients (parameters) of the function are found to solve simultaneous equations so that the values of the expression itself, the differential and the quadratic differential are continuous, respectively. Namely, since the disclosed method aims to provide distribution of the prismatic powers (inclinations of the lens surface), default distribution of the prismatic powers is applied at the beginning, the shape of the lens surface is calculated based on the default distribution, and then the surface shape is represented by the bicubic polynomial functions for the rectangular areas to evaluate the optical performance.

A design method disclosed in WO 96/11421 sets default values of radius of curvature on principal points, and it divides the entire area of the lens surface into rectangular areas that are divided by lattice. Ray tracing is applied to each of the rectangular areas to evaluate the optical performance of the lens, and then the radii of curvature are corrected according to the evaluation. Bi-cubic expressions are defined for the rectangular areas, and then the optical performance of the surface shape is checked. When there is room for improvement in the optical performance, the radius of curvatures are reset to re-define the bicubic polynomial functions. The cycle of check and reset is repeated until the optimum shape is obtained.

However, Sho 55-146412 only discloses the method for evaluating the optical performance of the lens surface, while it does not disclose how to change the parameters. Further, since the method finds the bicubic polynomial functions based on the differentials and the like after setting the refractive prism powers, the prismatic powers must be the parameters of the design even if the surface shape is changed according to the evaluation. However, since the lens shape represented by the distribution of the prismatic powers is not directly related to refractive power and astigmatism that are important items to evaluate the progressive power lens, it is difficult to determine how to change the prismatic powers based on the evaluation to correct aberrations, which increases number of times of the trial and error for the optimization, requiring huge calculations.

On the other hand, since the optical performance can be evaluated by the computerized ray tracing only after the lens shape is represented by the mathematical function, the method disclosed in WO 96/11421 does not actually evaluate the optical performance. Further, the radius of curvature in an X direction must be different from that in a Y direction in the non-rotationally symmetrical surface such as the progressive power lens, while the disclosed method does not distinguish the difference. Moreover, the publication does not show how to determine the lens shape based on the radii of curvature given for the principal points on the lens surface.

SUMMARY OF THE INVENTION

It is therefore an object of the present invention to provide a design method of an optical curved surface on the condition that areas of a lens surface divided by a lattice are represented by mathematical functions, which is capable of efficiently calculating a shape of the entire lens surface and a shape of the each area of the lens surface based on curvatures (refractive powers) of the lens surface as parameters that are directly related to aberrations.

For the above object, according to the present invention, there is provided a design method of an optical curved surface, which includes:

dividing an optical curved surface into a plurality of rectangular areas that are divided by the lattice;

defining an original lattice point on the lattice, a backbone line that crosses the original lattice point on the lattice, and standard lattice points that are the lattice points located on the backbone line except the original lattice point;

applying curvatures to all of the lattice points;

applying inclinations to the original lattice point and the standard lattice points;

applying sag to the original lattice point;

calculating a sectional shape of the curved surface along the backbone line based on the sag and inclination of the original lattice point and the curvatures of the lattice points on the backbone line;

calculating sags of the standard lattice points based on the calculated sectional shape;

calculating sectional shapes along orthogonal lines that are orthogonal to the backbone line based on the calculated sags and the applied inclinations of the standard lattice points and the applied curvatures of the lattice points on the orthogonal lines; and representing the rectangular areas as mathematical functions respectively based on the calculated sectional shapes.

With this method, the sectional shape along the backbone line is calculated with integration based on parameters such as curvatures applied to the lattice points at first, and the sectional shapes along the orthogonal lines are calculated with integration. The surface shape in each of the rectangular areas are, for example, represented by a bicubic polynomial function, which enables evaluation of the optical performance. The curvatures applied as parameters can be replaced with sectional surface powers.

When the parameters are changed based on the evaluation result, the curvature is preferable as the parameter because of its direct relationship with the aberration.

The design method may further include:
evaluating optical performance of the optical curved surface represented by the mathematical functions; and
changing at least one of the applied sag, inclinations and curvatures based on the evaluated result.

The calculation of the sectional shape along the backbone line may include:
a first integration of the curvatures with the value corresponding to the inclination of the original lattice point as an integration constant to obtain a distribution of the values corresponding to the inclinations along the backbone line; and
a second integration of the distribution of the values corresponding to the inclinations with the sags of the original lattice point as an integration constant to obtain the sectional shape along the backbone line.

The calculation of the sectional shape along the orthogonal line may include:
a first integration of the curvatures with the value corresponding to the inclination of the standard lattice point on the orthogonal lattice point as an integration constant to obtain a distribution of the values corresponding to the inclinations along the orthogonal line; and
a second integration of the distribution of the values corresponding to the inclinations with the sags of the standard lattice point on the orthogonal line as an integration constant to obtain the sectional shape along the orthogonal line.

When the optical curved surface has a distribution of the variation of curvature, it is preferable that the rectangular areas are relatively small where the variation of curvature is relatively large and the rectangular areas are relatively large where the variation of curvature is relatively small.

Further, the optical curved surface may be divided by a first lattice whose pitch is relatively large and by a second lattice whose pitch is relatively small. In such a case, the parameters are applied to the lattice points of the first lattice, and the design method further includes:
calculating the parameters for the lattice points of the second lattice by interpolating the parameters applied to the lattice points of the first lattice,
calculating a sectional shape of the curved surface along the backbone line based on the parameters of the lattice points of the second lattice, and
calculating a sectional shape of the curved surface along orthogonal lines that are orthogonal to the backbone line based on the parameters of the lattice points of the second lattice.

DESCRIPTION OF THE ACCOMPANYING DRAWINGS

FIG. 3 is a table showing concrete numerical values of the parameters in FIG. 2;

FIG. 9 is a table showing concrete numerical values of the parameters of the lattice points of the second lattice in FIG. 8 where $3 \leq m \leq 13$;

FIG. 10 is a table showing concrete numerical values of the parameters of the second lattice in FIG. 8 where $14 \leq m \leq 30$;

DESCRIPTION OF THE EMBODIMENTS

First Embodiment

Figure 1:
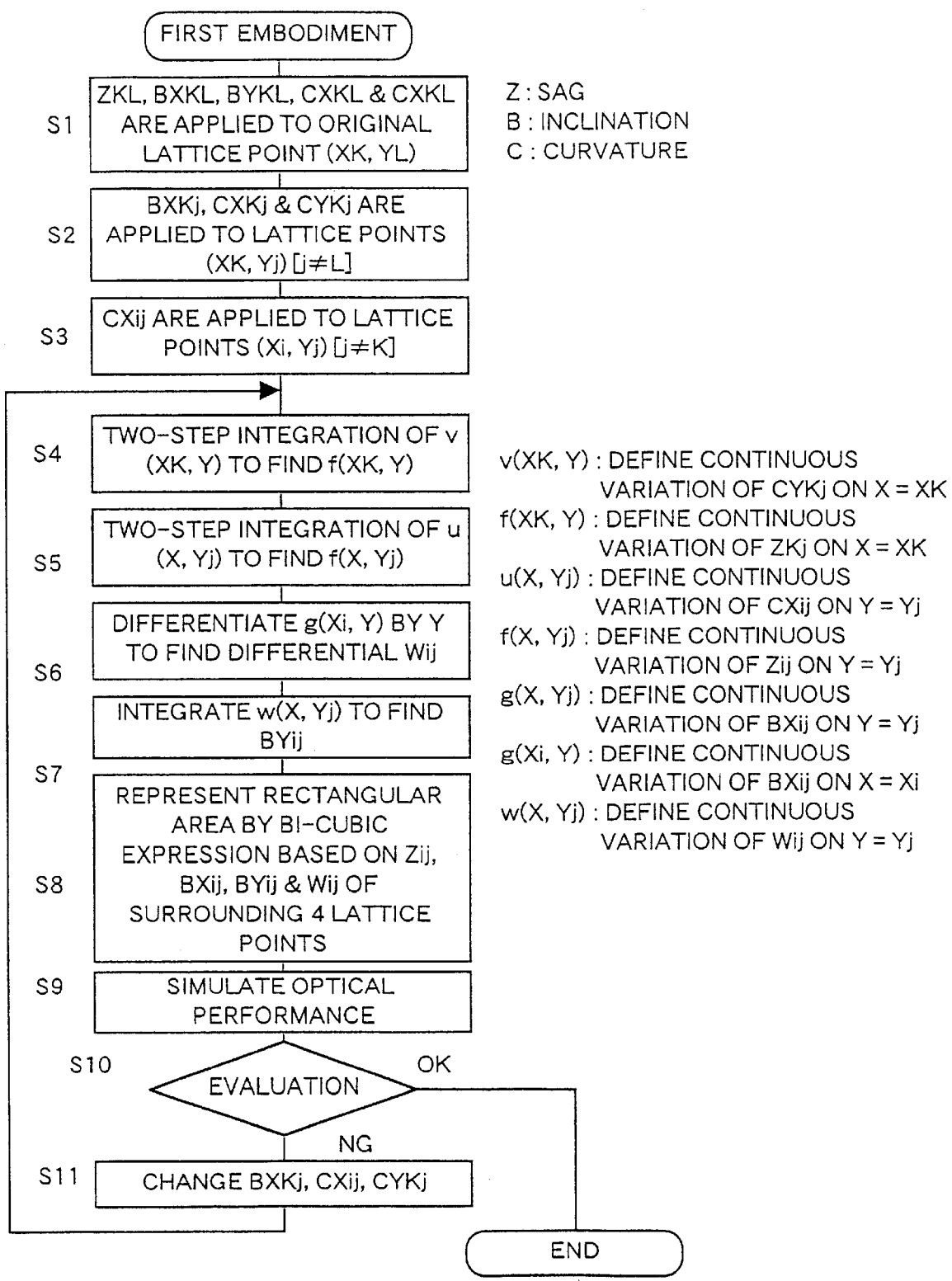
FIG. 1 is a flowchart that shows a design method according to a first embodiment.
Figure 2:
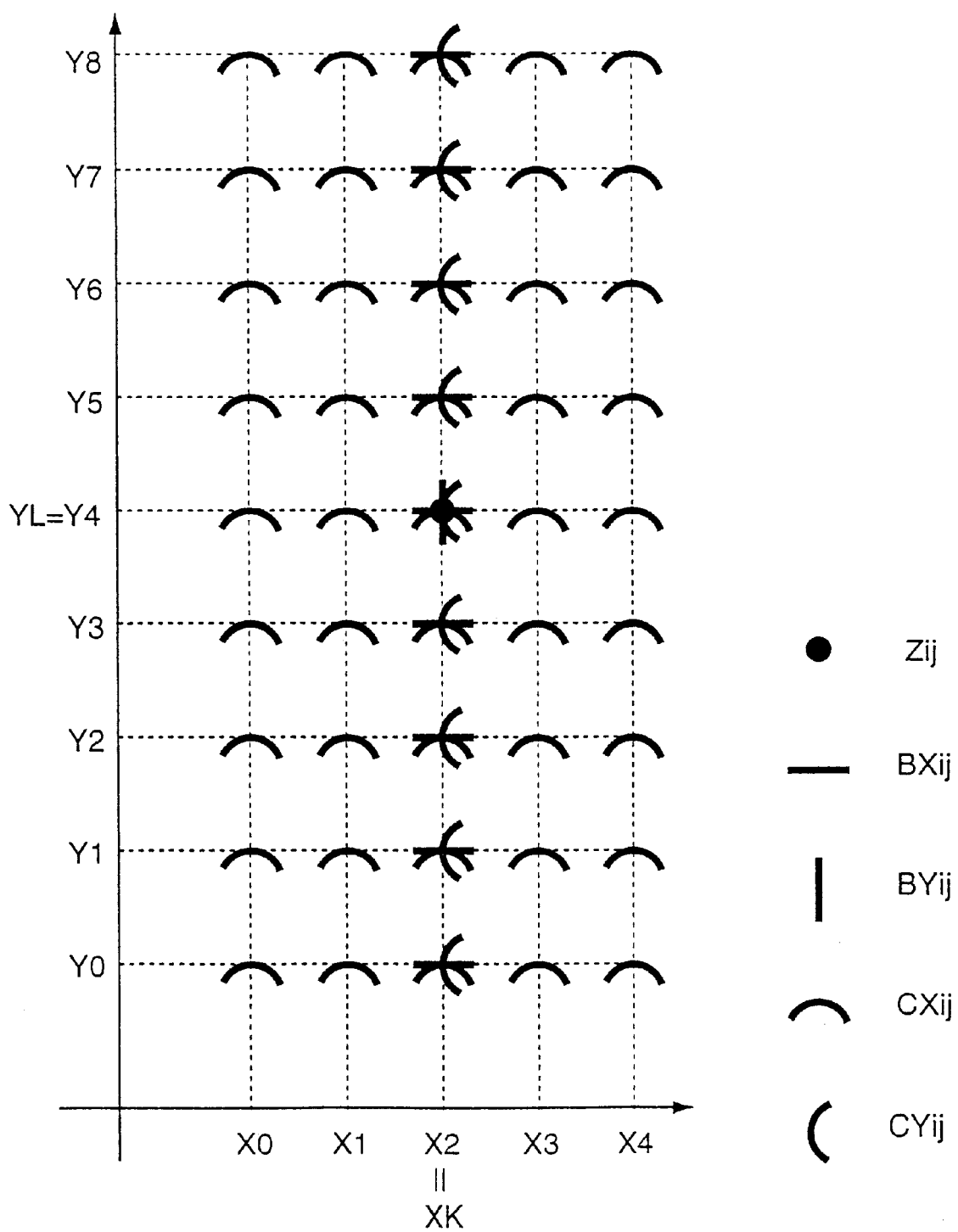
FIG. 2 shows parameters that are applied to the design method of FIG. 1 for designing an fθ lens.

A first embodiment shows the design method to design a non-rotationally asymmetrical fθ lens. FIG. 1 is a flowchart showing a design method according to a first embodiment, FIG. 2 shows parameters that are applied to the design method of FIG. 1, FIG. 3 is a table showing concrete numerical values of the parameters and FIGS. 4A–4E show calculation steps of the design method.

Settings of coordinate axes and rectangular areas are described with reference to FIG. 2. A Z-axis is defined as an axis that is perpendicular to the sheet of FIG. 2, an XY-plane is perpendicular to the Z-axis. In the XY plane, a curved surface of the fθ lens is divided into a plurality of rectangular areas that are divided by lattice. The lattice is shown by I×J matrix, particularly by 4×8 matrix in FIG. 2. Intersections of boundary lines shown by dotted lines are defined as lattice points whose XY coordinates are represented by $(X_i, Y_j)$ [$0 \leq i \leq I$, $0 \leq j \leq J$, i, j are integers]. An original lattice point is defined as $(X_K, Y_L)$. The original lattice point is located in the center of an effective area of the curved surface in this embodiment, that is, K=2 and L=4. Since K and L are constants and i and j are discrete variables, XK is a constant to indicate the X-coordinate of the original lattice point, and Xi is a discrete variable to indicate the X-coordinate of one of the lattice points where $0 \leq i \leq I$, X is a continuous variable to indicate the X-coordinate of an arbitrary point.

In a step S1 of FIG. 1, various parameters, which are a sag in the Z-axis direction ZKL, an inclination in the X-axis direction BXKL, an inclination in the Y-axis direction BYKL, a curvature in the X-axis direction CXKL and a curvature in the Y-axis direction CYKL, are applied to the original lattice point (XK, YL).

In a step S2, various parameters, which are the inclinations in the X-axis direction BXKj, the curvatures in the X-axis direction CXKj and the curvatures in the Y-axis direction CYKj, are applied to each of lattice points (XK, Yj) [j≠L]. In the description, the straight line "X=XK" that is parallel to the Y-axis and crosses the original lattice point (XK, YL) is referred as the "backbone line" and the lattice points that are arranged on the backbone line except the original lattice point (XK, Yj) [j≠L] are referred as standard lattice points. The term "lattice points on the backbone line" includes the original lattice point and the standard lattice points.

In a step S3, the curvature in the X-axis direction CXij is applied to each of the lattice points (Xi, Yj) [i≠K] that are all of lattice points except the lattice points on the backbone line.

The above described three steps set the parameters. In FIG. 2, a symbol "·" represents Zij, "–" represents BXij, "|" represents BYij, "Å" represents CXij and "<" represents CYij. Namely, the curvatures in the X-axis direction CXij is applied to the every lattice point (Xi, Yj), the inclination in the X-axis direction BXKj and the curvature in the Y-axis direction CYKj are applied to the lattice points (XK, Yj) on the backbone line, and the sag ZKL and the inclination BYXL is only applied to the original lattice point (XK,YL).

FIG. 3 is a table showing concrete numerical values of the parameters in FIG. 2. Symbols ΔCYKj and ΔCXij show differences of the curvatures CYKj and CXij from the values of CYKL and CXKL at the original lattice point. The curved surface of the fθ lens has width of ±60.00 mm in the Y-axis direction and width of ±6.00 mm in the X-axis direction. The curved surface is divided into 8 areas in the Y-axis direction and into 4 areas in the X-axis direction. The values ΔCYKj and BXKj are applied to the lattice points (XK, Yj) on the backbone line, as shown in the left side of the table. The values ΔCXij are applied to the other lattice points that are not arranged on the backbone line as shown in the right side of the table. The parameters applied to the original lattice point (XK, YL) are shown as follows.

| | |
|---|---|
| CXKL = −8.28 × 10⁻³ | BYKL = 0.00 |
| CYKL = −3.73 × 10⁻³ | ZKL = 0.00 |

In the following steps, mathematical functions that represent the surface shape are calculated based upon the applied parameters described above Sag Z, inclination BX and BY, curvatures CX and CY at the arbitrary lattice point (X, Y) are defined as the following functions.

z=f(X, Y)
BX=g(X, Y)
BY=h(X, Y)
CX=u(X, Y)
CY=v(X, Y)

The values of the parameters at each of the lattice points are defined as follows.

Zij=f(Xi, Yj)
BXij=g(Xi, Yj)
BYij=h(Xi, Yj)
CXij=u(Xi, Yj)
CYij=v(Xi, Yj)

The functions u and v, which represent distributions of the curvatures, are integrated to obtain the functions that represent distribution of values corresponding to the inclinations. Since the integration of the functions u and v do not directly get the functions g and h that represent distribution of the inclination, intermediate functions p and q are defined as follows. The function f that represents distribution of the sags is found by integrating the functions g and h.

$$p(X, Y) \equiv \frac{g}{\sqrt{1+g^2}}$$

$$q(X, Y) \equiv \frac{h}{\sqrt{1+h^2}}$$

The above described definitions result the following relationships.

$$g(X, Y) \equiv \frac{\partial f}{\partial X}$$

$$h(X, Y) \equiv \frac{\partial f}{\partial Y}$$

$$u(X, Y) \equiv \frac{\partial p}{\partial X}$$

$$v(X, Y) \equiv \frac{\partial q}{\partial Y}$$

Further, the differential w of the function f(X, Y) by X and Y is defined as follows.

$$w(X, Y) \equiv \frac{\partial^2 f}{\partial X \partial Y}$$

In a step S4, the function v(XK, Y) that defines the continuous variation of the curvatures in the Y-axis direction CYKj along the backbone line is found, and the function f(XK, Y) that defines the continuous variation of the sags ZKj along the backbone line is calculated from the function v(XK, Y) by the process including two-step integration. The function v(XK, Y) defines a curve to smoothly connect the discrete curvatures of the lattice points on the backbone line on a graph showing relationship between the curvature and the Y-coordinate. In the same manner, the function f(XK, Y) defines a curve to smoothly connect the discrete sags of the lattice points on the backbone line on a graph showing relationship between the sag and the Y-coordinate. The step S4 corresponds to the calculation shown in FIG. 4A. It is noted that the curved surface is divided into the areas of 2×4 matrix in order to simplify the drawings in FIGS. 4A–4E, while the process in each step is common in spite of the size of the matrix.

The process of the step S4 includes two integral steps. In the first integral step, the function v(XK, Y) is integrated with respect to Y with the integration constant q(XK, YL) that corresponds to the inclination in the Y-axis direction BYKL at the original lattice point (XK, YL). This process results in the function q(XK, Y) that defines the continuous variation of the inclination in the Y-axis direction along the backbone line as follows. The function q(XK, Y) continuously connects the discrete distribution of the inclination in the Y-axis direction BYKj (=q(XK, Yj)) of the lattice points on the backbone line.

$$q(X_K, Y) = \int_{Y_L}^{Y} v(X_K, Y) dY + q(X_K, Y_L)$$

Where the integration constant q(XK,YL) is expressed by the following equation.

$$q(XK, YL) = \frac{h(XK, YL)}{\sqrt{1 + h(XK, YL)^2}} = \frac{BYKL}{\sqrt{1 + BYKL^2}}$$

Further, the function h (XK, Y) that defines the continuous variation of the inclinations in the Y-axis direction is found based on the function q(XK, Y) according to the above described relationship between the function q(X, Y) and the function h as shown in follows.

$$h(XK, Y) = \frac{q(XK, Y)}{\sqrt{1 - q(XK, Y)^2}}$$

In the second integral step at the step S4, the function h(XK, Y) is integrated with respect to Y with the sag ZKL of the original lattice point to calculate the function f(XK, Y) as shown by the following equation.

$$f(XK, Y) = \int_{Y_L}^{Y} h(X_K, Y) dY + f(X_K, Y_L)$$
$$= \int_{Y_L}^{Y} h(X_K, Y) dY + Z_{KL}$$

The process of the step S4 determines BYKj=h(XK,Yj) and ZKj=f(XK,Yj), which finds the sectional shape of the curved surface along the backbone line.

In a step S5, the functions u(X, Yj) are calculated first. The functions u(X, Yj) define the continuous variations of the curvatures in the X-axis direction CXij of the lattice points (Xi, Yj) arranged on orthogonal lines Y=Yj. The orthogonal line cross the backbone line at right angles. Further, the functions f(X, Yj) that define the continuous variations of the sags ZKj of the lattice points on the orthogonal lines Y=Yj are calculated from the functions u(X, Yj) by the process including two integration steps. The process of the step S5 corresponds to the calculation of FIG. 4B. This process finds the sectional shapes of the curved surface along the orthogonal lines Y=Yj.

The process of the step S5 includes two integral steps for the every orthogonal line. In the first integral step, as shown in the following equation, the functions u(X, Yj) are integrated with respect to X with the integration constants p (XK, Yj) that correspond the inclinations in the X-axis direction on the lattice points (XK, Yj) on the backbone line to obtain the functions p(X, Yj) that define the continuous variations of the inclinations in the X-axis direction at the lattice points (XK, Yj) arranged on the orthogonal lines. The functions p(X, Yj) continuously connect the discrete distributions BXij (=p(Xi, Yj)) of the inclinations in the X-axis direction.

$$p(X, Y_j) = \int_{X_K}^{X} u(X, Y_j) dX + p(X_K, Y_j)$$

Where the integration constanst p(XK,Yj) are expressed by the following equation.

$$p(XK, Yj) = \frac{g(XK, Yj)}{\sqrt{1 + g(XK, Yj)^2}} = \frac{BXKj}{\sqrt{1 + BXKj^2}}$$

Further, the function g (x, Yj) that defines the continuous variation of the inclinations in the X-axis direction at the lattice points arranged on the orthogonal line Y=Yj is found based on the function p(X, Yj) according to the above described relationship between the function p(X, Y) and the function g as shown in follows.

$$g(X, Yj) = \frac{p(X, Yj)}{\sqrt{1 - p(X, Yj)^2}}$$

In the second integral step at the step S5, the function g(X, Yj) is integrated with respect to X with the sag ZKj of the lattice point on the backbone line as the integration constant to calculate the function f(X, Yj) for the every orthogonal line as shown by the following equation.

$$f(X, Yj) = \int_{X_K}^{X} g(X, Yj) dX + f(X_K, Yj)$$
$$= \int_{X_K}^{X} g(X, Yj) dX + Z_{Kj}$$

The process in the step S5 determines BXij=g(Xi,Yj) and Zij=f(Xi,Yj), which finds the sectional shape of the entire area of the curved surface.

Steps S6 and S7 are processes to calculate the inclinations in the Y-axis direction BYij. The inclinations in the X-axis direction BXij that are calculated as rows in the X-axis direction are regarded as rows in the Y-axis direction to calculate the function g(Xi, Y) that defines the continuous variation of the inclinations in the X-axis direction along the Y-axis direction. Then, the differential of the function g(Xi, Y) by Y is integrated with respect to X to calculate the inclinations in the Y-aixs direction BYij.

In the step S6, the function g(Xi, Y) that continuously connects the discrete distribution of the inclinations BXij is differentiated by Y to find differential Wij at each lattice point (Xi, Yj) as shown in the following equations.

$$w(Xi, Y) = \frac{\partial g(Xi, Y)}{\partial Y}$$
$$Wij = w(Xi, Yj)$$

Figure 4A:
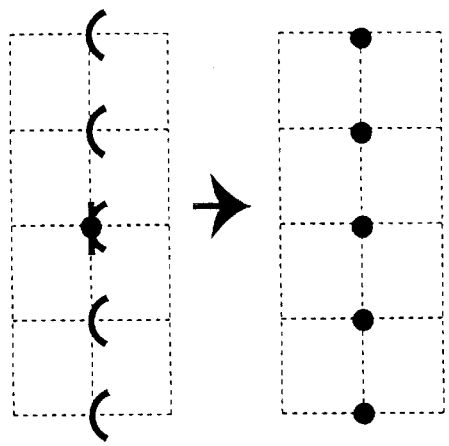
FIGS. 4A–4E show calculation steps of the design method in FIG. 1.
Figure 4B:
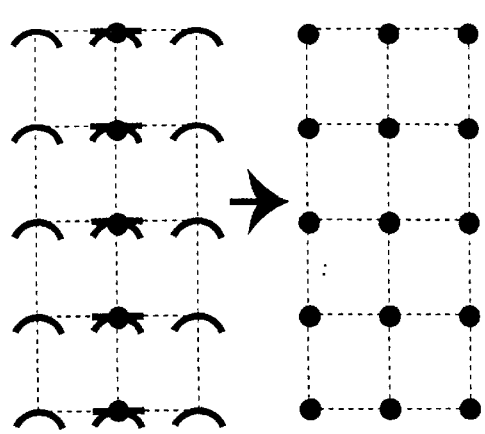
Figure 4C:
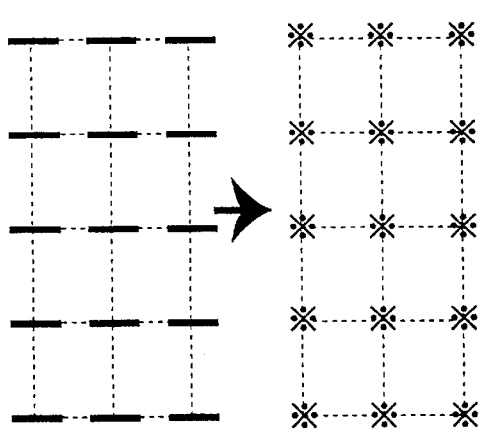
Figure 4D:
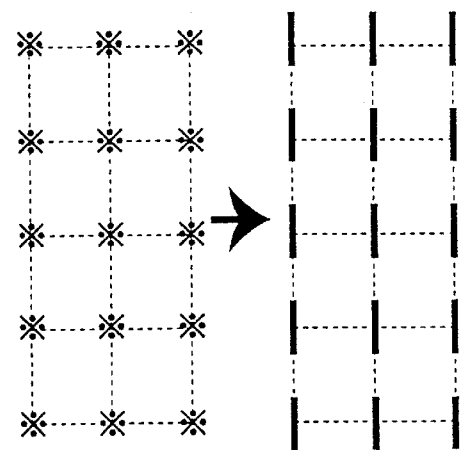
Figure 4E:
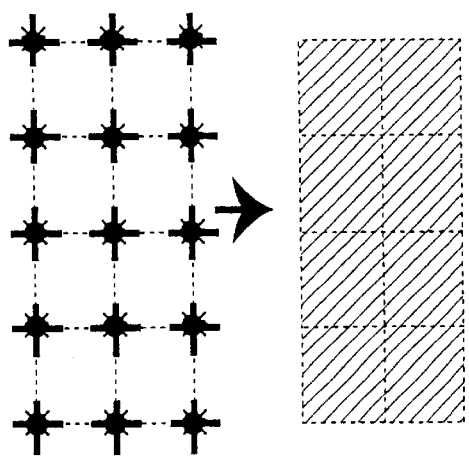

The process in the step S6 corresponds to the calculation of FIG. 4c. Symbol "$\dot{X}$" represents the differential Wij of each lattice point.

In the step S7, the functions w(X, Yj), which defines continuous variations of the differentials Wij of the lattice points (Xi, Yj) on the orthogonal lines Y=Yj, is integrated with respect to X with the integration constants h(XK, Yj) that are the inclination at the lattice points on the backbone line to calculate the functions h(X, Yj) as shown in the following equation.

$$h(X, Yj) = \int_{X_K}^{X} w(X, Yj)dX + h(X_K, Yj)$$

$$= \int_{X_K}^{X} w(X, Yj)dX + BY_{Kj}$$

The functions h(X, Yj) define continuous variations of the inclination in the Y axis direction along the orthogonal lines Y=Yj. In accordance with the function h(X, Yj), the inclinations in the Y-axis direction BYij (=h(Xi, Yj)) at each lattice point (Xi, Yj) is calculated. The process of the step S7 corresponds to the calculation of FIG. 4D.

The processes from the steps S1–S7 determine four kinds of parameters Zij, BXij, BYij and Wij that show the shape of the curved surface for all of the lattice points (Xi, Yj) [0≦i≦I, 0≦j≦J]. In a step S8, a rectangular area Rij={ (X, Y) |$X_{i-1}$≦X≦Xi, $Y_{j-1}$≦Y≦Yj} is represented by the following bicubic polynomial function with respect to X and Y.

$$fij(X, Y) = \sum_{a=0}^{3}\sum_{b=0}^{3} (\gamma_{ab}^{(ij)}(X - X_{i-1}))^a \cdot (Y - Y_{j-1})^b$$

Sixteen coefficients included in the bicubic polynomial function are defined by simultaneous equations using sixteen parameters that are the four parameters for each of four lattice points surrounding the rectangular area. The coefficients $\gamma_{ab}^{(ij)}$ for the rectangular area Rij whose order is ij where the lattice points ($X_{i-1}$, $Y_{j-1}$) and (Xi, Yj) are opposite corners are calculated from the following matrix.

$$\begin{bmatrix} \gamma_{00} & \gamma_{01} & \gamma_{02} & \gamma_{03} \\ \gamma_{10} & \gamma_{11} & \gamma_{12} & \gamma_{13} \\ \gamma_{20} & \gamma_{21} & \gamma_{22} & \gamma_{23} \\ \gamma_{30} & \gamma_{31} & \gamma_{32} & \gamma_{33} \end{bmatrix} =$$

$$\begin{bmatrix} 1 & 0 & 0 & 0 \\ 0 & 1 & 0 & 0 \\ -3/\Delta X_{i-1}^2 & -2/\Delta X_{i-1} & 3/\Delta X_{i-1}^2 & -1/\Delta X_{i-1} \\ 2/\Delta X_{i-1}^3 & 1/\Delta X_{i-1}^2 & -2/\Delta X_{i-1}^3 & 1/\Delta X_{i-1}^2 \end{bmatrix} \cdot$$

$$\begin{bmatrix} Z_{i-1 j-1} & BY_{i-1 j-1} & Z_{i-1 j} & BY_{i-1 j} \\ BX_{i-1 j-1} & W_{i-1 j-1} & BX_{i-1 j} & W_{i-1 j} \\ Z_{ij-1} & BY_{ij-1} & Z_{ij} & BY_{ij} \\ BX_{ij-1} & W_{ij-1} & BX_{ij} & W_{ij} \end{bmatrix} \begin{bmatrix} 1 & 0 & -3/\Delta Y_{j-1}^2 & 2/\Delta Y_{j-1}^3 \\ 0 & 1 & -2/\Delta Y_{j-1} & 1/\Delta Y_{j-1}^2 \\ 0 & 0 & 3/\Delta Y_{j-1}^2 & -2/\Delta Y_{j-1}^3 \\ 0 & 0 & -1/\Delta Y_{j-1} & 1/\Delta Y_{j-1}^2 \end{bmatrix}$$

Where $\Delta X_{i-1}$=Xi-$X_{i-1}$ and $\Delta Y_{j-1}$=Yj-$Y_{j-1}$.

The determination of the coefficients $\gamma_{ab}^{(ij)}$ enables the calculation of the sags Z (=fij (X, Y)) at a arbitrary point in the rectangular area Rij and the differentials thereof by X and Y. Therefore, the coefficients $\gamma_{ab}^{(ij)}$ are determined for every rectangular area, which determines the expression Z=f(X, Y) that represents the entire area of the curved surface as a set of the expressions fij (X, Y) [0≦i≦I, 0≦j≦J]. The expression Z=f(X, Y) guarantees that the values of the expression itself, the differential and the quadratic differential are continuous in the entire areas. The process of the step S8 corresponds to the calculation of FIG. 4E.

In a step S9, the optical performance is simulated based on the determined shape of the curved surface. And then, the optical performance is evaluated based on the result of the simulation. If the evaluation result shows satisfactory optical performance, the design process is terminated. On the other hand, if the evaluation result is no good, the curvatures CXij and CYKj are changed to optimize the performance in a step S11 and the process returns to the step S4. The parameter to be changed in the step S11 is not only limited to the curvatures, the inclinations in the X-axis direction BXKj of the lattice points on the backbone line can be adjusted.

In the above described embodiment, since the curved surface of the fθ lens is divided into a plurality of rectangular areas and each of the areas is represented by the respective mathematical function, the change of the parameter only affects the areas in the vicinity of the target area whose parameters are changed, which enables local optimization of the performance, providing the appropriate method for designing complex aspherical surfaces.

Since the curvatures CXij and CYKj that have direct relationship with aberrations are used as parameters, the effect of the change of the parameter can be directly grasped, which provides good design prospect. Further, in the fθ lens, the curvatures CYKj control linearity of scanning and field curvature in a principal scanning direction, the curvatures CXKj control field curvature in an auxiliary scanning direction and the inclinations BXKj control curvature of a scanning line (Bow), respectively. Therefore, the operator (or the computer software) can foresee the kind of the parameter and the changing amount thereof in order to reduce the aberration to improve the optical performance.

Second Embodiment

A second embodiment will be described hereinafter. In the second embodiment, the design method of the present invention is applied to design of a progressive power lens. An optical curved surface of the progressive lens is divided by a first lattice whose pitch is relatively large and by a second lattice whose pitch is relatively small in the second embodiment. Values are applied to the parameters of the lattice points of the first lattice. The parameters of the lattice point of the second lattice are calculated by interpolating the parameters applied to the lattice points of the first lattice. The surface shape is determined based on the parameters of the lattice point of the second lattice.

Figure 5:
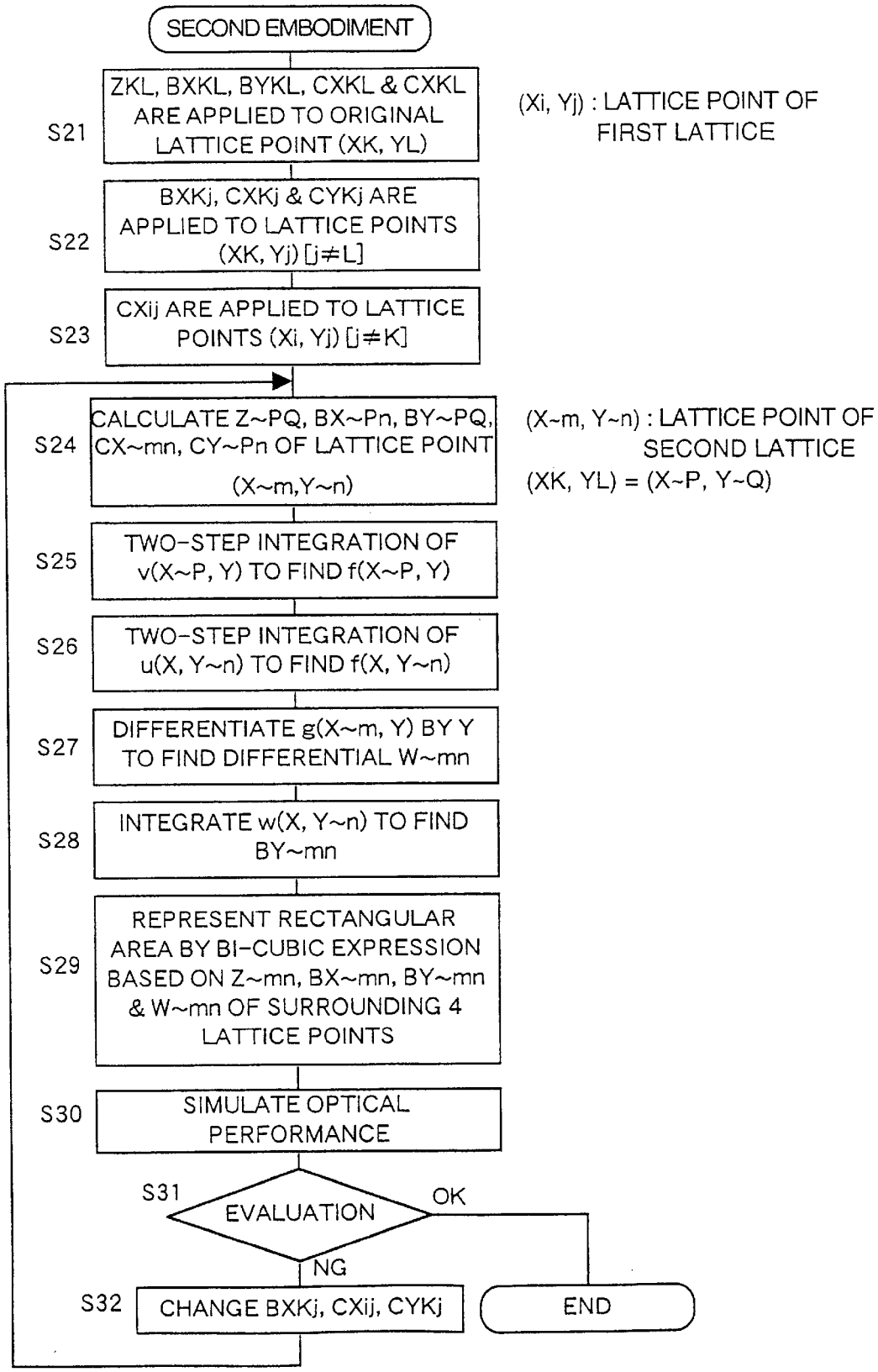
FIG. 5 is a flowchart that shows a design method according to a second embodiment.
Figure 6:
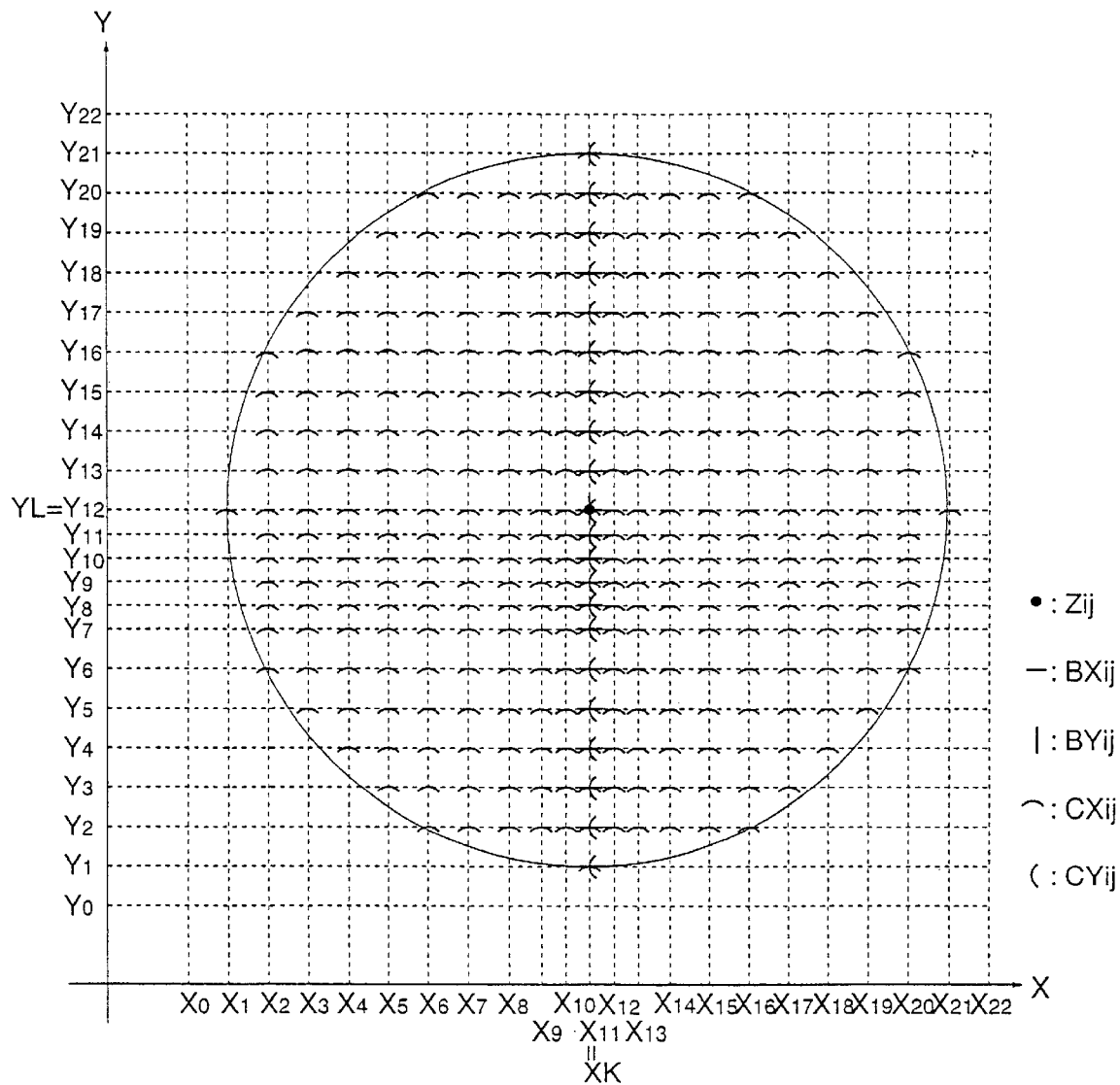
FIG. 6 shows parameters of a lattice points of a first lattice that are applied to the design method of FIG. 5 for designing a progressive power lens.
Figures 7, 7A:
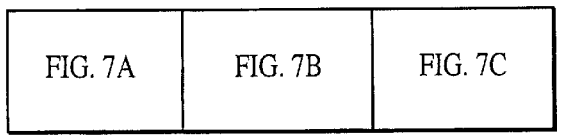
FIG. 7 is a table showing concrete numerical values of the parameters of the lattice points of the first lattice in FIG. 6.
Figure 8:
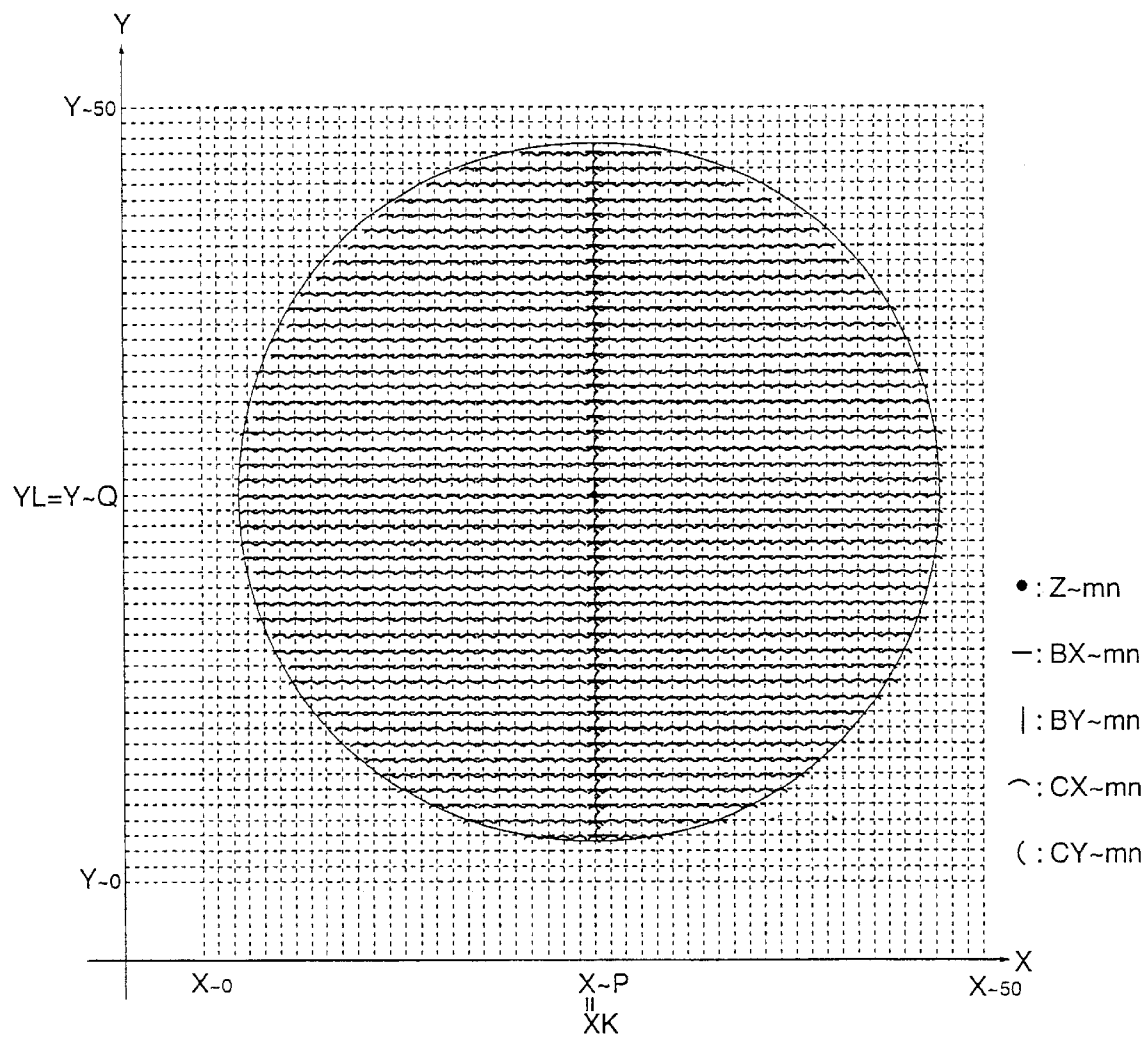
FIG. 8 shows parameters of a second lattice that are applied to the design method of FIG. 5 for designing the progressive power lens.
Figure 11:
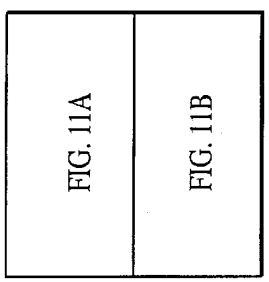
FIG. 11 is a table showing concrete numerical values of the parameters of the second lattice in FIG. 8 where $31 \leq m \leq 47$.
Figure 11A:
Figure 12A:
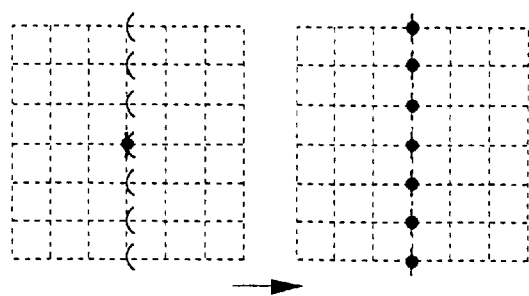
FIGS. 12A–12E show calculation steps of the design method in FIG. 5.
Figure 12B:
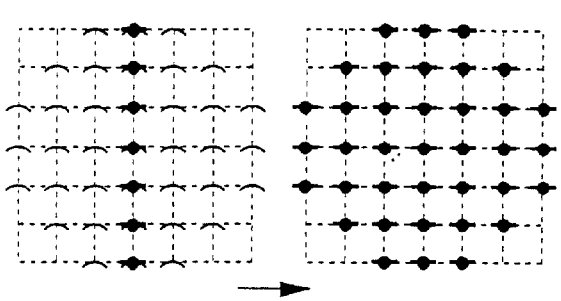
Figure 12C:
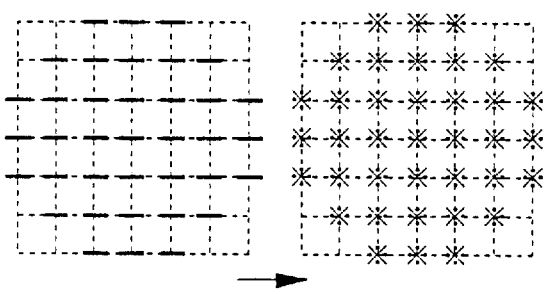
Figure 12D:
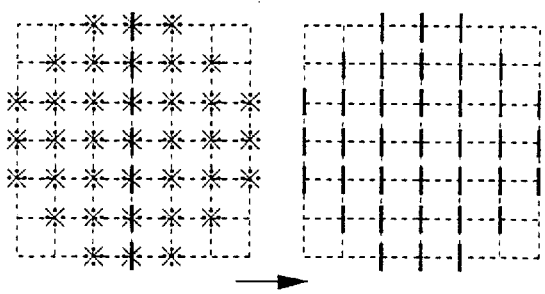
Figure 12E:
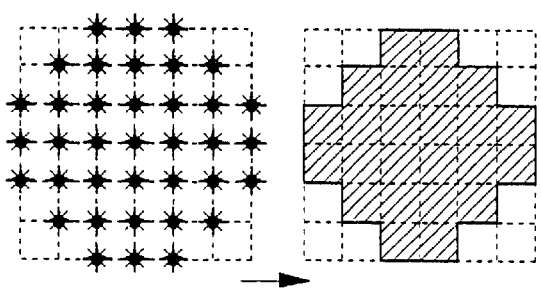

FIG. 5 is a flowchart that shows a design method according to the second embodiment, FIG. 6 shows parameters of the lattice points of the first lattice, FIG. 7 is a table showing concrete numerical values of the parameters of the first lattice in FIG. 6, FIG. 8 shows parameters of the lattice points of the second lattice, FIGS. 9–11 are tables showing concrete numerical values of the parameters of the lattice points of the second lattice and FIGS. 12A–12E show calculation steps of the design method of FIG. 5.

In the following description, a coordinate of a lattice point of the first lattice is defined as (Xi, Yj), and that of the second lattice is defined as (X~m, Y~n). Further, an original lattice point (XK, YL) of the first lattice is coincident with an original lattice point (X~P, Y~Q) of the second lattice, and thus the backbone lines of the lattices are coincident with each other.

The entire rectangular area of 100 mm×100 mm that includes the lens surface is divided into a plurality of rectangular areas by the first lattice that has 22×22 matrix, and it is divided by the second lattice that has 50×50 matrix. It will be noted K=11, L=12, I=J=22, P=Q=25, M=N=50. The size of the rectangular area divided by the first lattice is relatively small where the variation of curvature is relatively large and it is relatively large where the variation of curvature is relatively small. Since the progressive lens has an intermediate corridor where the variation of curvature is relatively large in the lower portion of the lens, the pitch of the first lattice is smaller in the intermediate corridor than in the other portion. The pitch of the second lattice is constant.

In step S21 of FIG. 5, various parameters, which are a sag in the Z-axis direction ZKL, an inclination in the X-axis direction BXKL, an inclination in the Y-axis direction BYKL, a curvature in the X-axis direction CXKL and a curvature in the Y-axis direction CYKL, are applied to the original lattice point (XK, YL) of the first lattice.

In step S22, various parameters, which are the inclinations in the X-axis direction $BXK_j$, the curvatures in the X-axis direction $CXK_j$ and the curvatures in the Y-axis direction $CYK_J$, are applied to each of the standard lattice points (XK, Yj) [j≠L] of the first lattice arranged on the backbone line X=XK.

In step S23, the curvatures in the X-axis direction $CX_{ij}$ is applied to each of the lattice points (Xi, Yj) [i≠K] of the first lattice except the lattice points on the backbone line. FIG. 6 shows the applied parameters for the lattice points of the first lattice. Meanings of the symbols are identical to that of FIG. 2.

The above described three steps set the parameters. FIG. 7 is a table showing concrete numerical values of the parameters in FIG. 6. In the table of FIG. 7, sectional refractive powers $Dx_{ij}$ and $DYK_j$ are applied to the lattice points in place of the curvatures $CX_{ij}$ and $CYK_j$. The sectional refractive power is directly related to the lens power, and thus it is preferable to be used as a parameter. The curvatures can be calculated by the following expressions.

$$CX_{ij}=Dx_{ij}/(In-1)$$

$$CYK_j=DYK_j/(In-1)$$

Where In is a refractive index of the lens.

The values $DYK_j$ and $BXK_j$ are applied to the lattice points (XK, Yj) on the backbone line as shown in the left side of the table. The values $DX_{ij}$ are applied to the other lattice points that are not arranged on the backbone line as shown in the right side of the table. The parameters applied to the original lattice point (XK, YL) are shown as follows.

BYKL=0.00 ZKL=0.00

Since a spectacle lens has a circular outline in an uncut fashion, it is not necessary to give the parameters $DX_{ij}$ for all of the lattice points (Xi, Yj) [0≦i≦22, 0≦j≦22]. In this embodiment, the parameters are applied to the lattice points covered by a circle whose diameter is 90 mm. The circle is set to cover the outline of an effective diameter 80 mm of the progressive lens. This reduces the number of parameters, reducing calculation. FIG. 7 shows the value $ij_{min}$ that is the minimum number of i on a j-th line being parallel to the X-axis and the value $ij_{max}$ that is the maximum number of i on the j-th line. In the tables, the parameters are not defined in the lattice points whose cells show "#####".

In the second embodiment, the function f(X, Y), which defines the variation of the sectional shape of the curved surface, can be determined by the parameters applied to the lattice points of the first lattice as well as the first embodiment. However, since the maximum pitch of the first lattice is larger than 5 mm, the variation of the sectional shape will become like a broken line (a polygonal line), the change of the sectional shape cannot be smooth enough for a spectacle lens. In the second embodiment, therefore, the second lattice having a smaller pitch is used, and the function f(X, Y) is determined by the parameters of the lattice points of the second lattice.

In step 24, the lens surface is divided by the second lattice having a smaller pitch than the first lattice. The parameters Z~PQ, BY~PQ, BX~Pn, CY~Pn and CX~mn of the lattice points of the second lattice are calculated by interpolating the parameters ZKL, BYKL, BXKJ, $CYK_j$ and $CX_{ij}$ applied to the lattice points of the first lattice. The following description is directed to the calculation in the step S24.

Since the second lattice is set so that the original lattice points are coincident with each other (X~P=XK and Y~Q=YL), the parameters on the original lattice point are coincident with each other (Z~PQ=ZKL and BY~PQ=BYKL). The curvatures in the Y-axis direction CY~Pn and the inclinations BX~Pn of the lattice points (X~P, Y~n) of the second lattice on the backbone line are calculated by interpolating the curvatures $CYK_j$ and the inclinations $BXK_j$ of the lattice points of the first lattice using a one-dimensional spline function along the backbone line X=XK.

Further, the curvatures CX~mj on the intersections between the lines X=X~m crossing the lattice points of the second lattice and the lines Y=Yj are calculated by interpolating the curvatures $CX_{ij}$ of the lattice points of the first lattice using the one-dimensional spline function along the lines Y=Yj. Then curvatures CX~mn of the lattice points (X~m, Y~n) of the second lattice are calculated by interpolating the curvatures CX~mj using the one-dimensional spline function along the lines X=X~m crossing the lattice points of the second lattice. These two steps for calculating the curvatures CX~mn can be replaced by the single step using a two dimensional spline function. The one or two dimensional spline function should be selected so that at least first order differentials are continuous.

FIG. 8 shows the calculated parameters of the lattice point of the second lattice in the step S24 Meanings of the symbols are identical to FIG. 2. FIGS. 9–11 show the concrete values of the parameters for the lattice points of the second lattice except peripheral areas (0≦n≦2, 48≦n≦50, 0≦m≦2, 48≦m≦50) where the parameters are not established. FIG. 9 shows the parameters in the range of 3≦m≦13, FIG. 10 covers the range of 14≦m≦30 and FIG. 11 covers the range of 31≦m≦47. The tables shown in FIGS. 9–11 are originally formed as one table, where FIG. 9 is left side, FIG. 11 is right side of FIG. 10, respectively.

The processes in steps S25 through S29 are similar to the steps S4 through S8 in FIG. 1, while the rectangular areas divided by the second lattice are represented by the bicubic polynomial functions calculated from the parameters of the lattice points (X~m, Y~n) of the second lattice. FIGS. 12A–12E show the processes to find the bicubic polynomial functions that correspond to the steps S25–S29. In FIGS. 12A–12E, the second lattice is shown by 6×6 matrix for the convenience of description.

In step 30, the optical performance is simulated based on the determined shape of the curved surface. And then, in step 31, the optical performance is evaluated based on the result of the simulation. If the evaluation result shows satisfactory optical performance, the design process is terminated. On the other hand, if the evaluation result is no good, the inclinations $BXK_j$, the curvatures $CX_{ij}$ and $CYK_j$ are changed to optimize the performance in step 32 and the process returns to the step S24.

As described above, the use of the second lattice to represent the curved surface causes smooth variation of the curvatures as compared with the process that only uses the first lattice. Further, the parameters are applied to the lattice points of the coarse first lattice and the parameters of the lattice points of the fine second lattice are automatically calculated from the parameters of the first lattice, which reduces the number of the parameters to be set by an operator as compared with the case where the parameters are directly set to the lattice points of the fine second lattice, reducing the burden of the parameter setting.

In the second embodiment, since the progressive surface is divided into a plurality of rectangular areas and each of the areas is represented by the respective mathematical function, the change of the parameter only affects the areas in the vicinity of the target area whose parameters are changed, which enables local optimization of the performance.

The refractive powers $DYK_j$ and $DXK_j$ control astigmatism and focal power along a main meridian that extends along the backbone line, the refractive powers $DX_{ij}$ control focal power of each area. The inclinations $BXK_j$ control inset that defines displacement of a near portion towards the nose, and the inclination $BYKL$ controls a balance of the sags along the Y-axis direction. The operator (or the computer software) can foresee the kind of the parameter and the changing amount thereof in order to reduce the aberration to improve the optical performance.

Figure 13A:
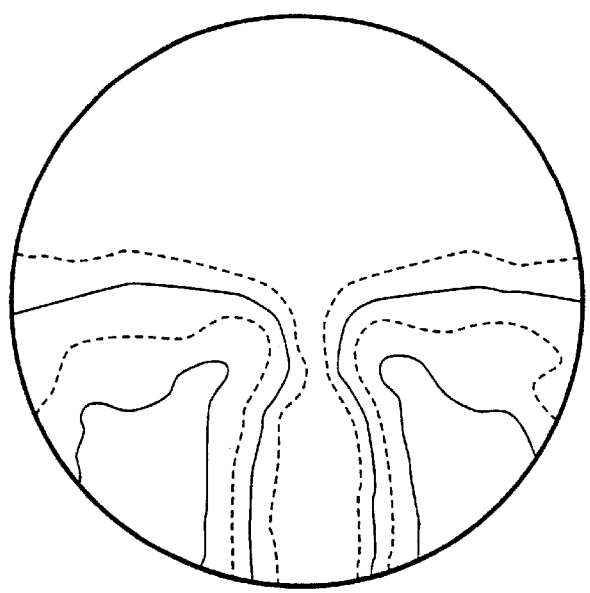
FIG. 13A shows distribution of surface astigmatism of the progressive power lens designed by the method of the second embodiment.
Figure 13B:
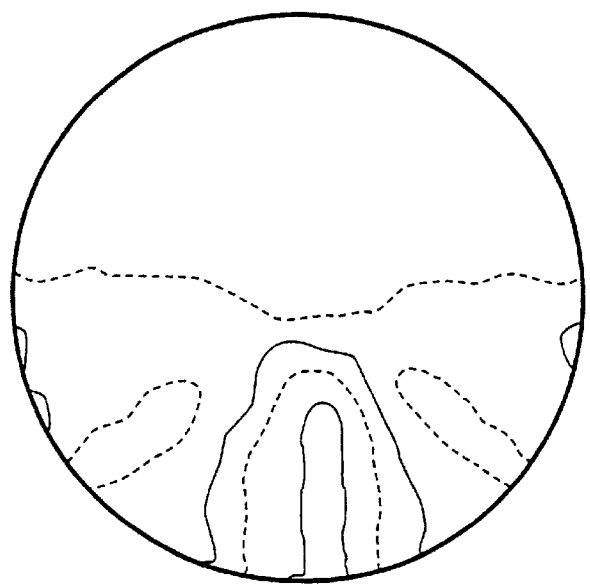
FIG. 13B shows distribution of average refractive power of the progressive power lens designed by the method of the second embodiment.

FIG. 13A shows distribution of surface astigmatism of the progressive power lens designed by the method of the second embodiment, and FIG. 13B shows distribution of average surface refractive power thereof.

Next, the optimizing ability of the method for designing a progressive power lens according to the second embodiment of the present invention is now described. Default values are distant from optimum values in order to compare the ability of the design method shown in FIG. 5 with the conventional design method. It will be noted that the following descriptions are only directed for the optimization of the sectional shape along the backbone line to ease the description.

In the steps S21–S23 in FIG. 5, the default values are applied to the parameters $ZKL$, $BYKL$ and $BXK_j$ of the lattice points of the first lattice. A lens shape of the opposite side of the progressive surface, a center thickness of the lens, refractive index of the lens or the like may be included in the parameters. In the steps S24–S29, the sectional shapes of the rectangular areas of the second lattice are represented by the bicubic polynomial functions.

In step 30, the optical performance and the shape performance are simulated considering wearing conditions of glasses. The simulation of the optical performance includes analyzing the sectional refractive power by differential geometry, calculations of aberrations caused by the ray transmitted by the lens using ray tracing. The simulation of the shape performance includes a calculation of the edge thickness of the lens.

In the step S31, the performance of the lens is evaluated by comparing the simulated performance with the predetermined target performance. If the evaluation shows a poor result, the parameters are changed to improve the performance. The parameter is changed with damped least square method.

Figure 14:
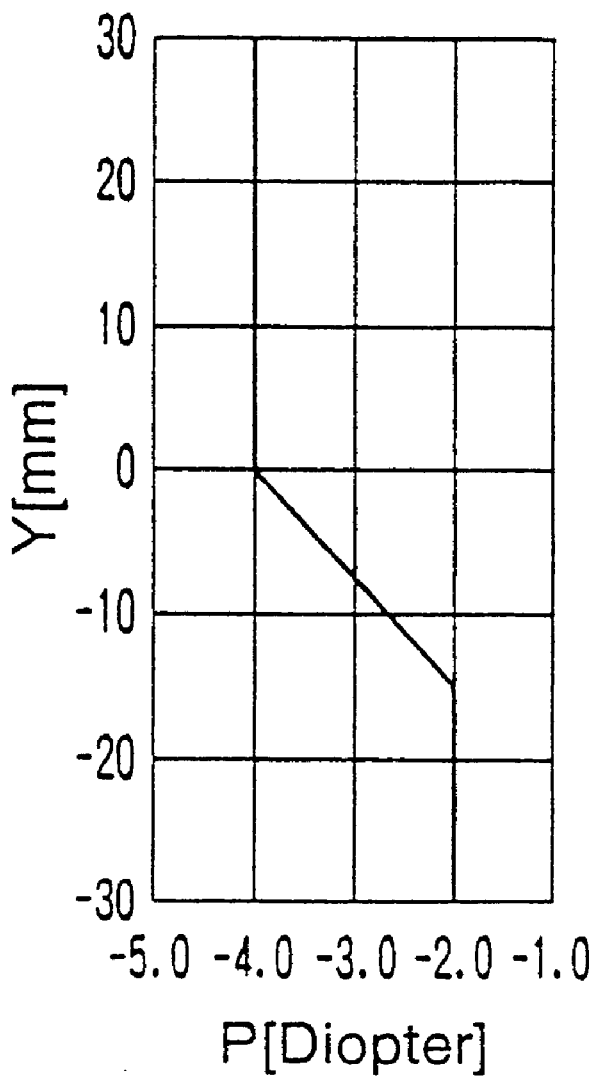
FIG. 14 is a graph showing a target value of refractive power in optimization.

FIG. 14 is a graph showing a target value of transmitting refractive power along the backbone line in the optimization, and FIGS. 15A–15E are graphs showing progress of the optimization by the design method according to the second embodiment using the damped least square method for changing the parameters. In the following descriptions, the design method of the second embodiment is referred as Power Spline Integral (PSI) method.

Figure 15:
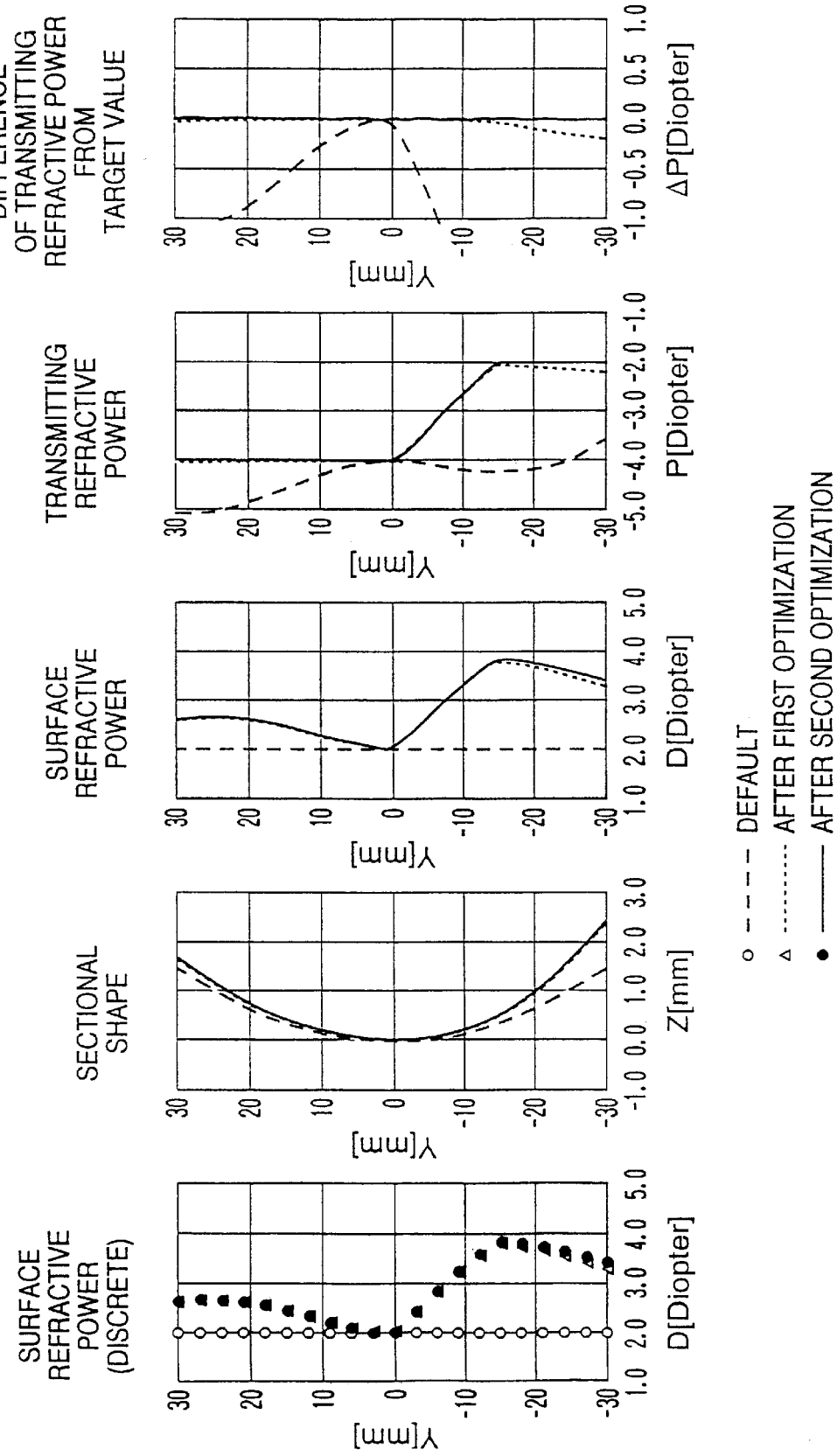
FIGS. 15A–15E are graphs showing progress of the optimization by the design method of FIG. 5.

The default parameters are, as shown in FIG. 15A, the surface refractive powers $DYK_j$ at the lattice points of the first lattice whose pitch is 3 mm. The applied default values represent a spherical surface, surface refractive power is 2 Diopter at the every lattice point. That is, the radius of curvature is 300 mm and the curvature is 3.33 m$^{-1}$ when the refractive index equals 1.60.

On the basis of the discrete distribution of the surface refractive powers shown in FIG. 15A, the continuous variation of the sectional shape (FIG. 15B), the continuous variation of the surface refractive power (FIG. 15C) and the continuous variation of the transmitting refractive power (FIG. 15D) are calculated. FIG. 15E shows the difference of the variation of the transmitting refractive power shown in FIG. 15D from the target variation thereof shown in FIG. 14. In FIG. 15A, a symbol "○" represents the default value, "Δ" represents the values after first optimization and "●" represents the values after second optimization. Further, in FIGS. 15B–15E, a long dotted line represents the default value, a short dotted line represents the value after first optimization and a solid line represents the value after second optimization.

As shown in FIG. 15E, the PSI method reaches the target value after two optimization iterations. The difference between the object distance of the upper side of the lens and that of the lower side causes the difference of the performance at the default condition.

Two conventional methods, Shape Spline Differential (SSD) and Polynomial (PLY) method, are described hereinafter to verify the abilities of the PSI method. The SSD method calculates the continuous variation of the shape based on the discrete distribution of the shape using spline interpolation. The PLY method simulates the optical performance using a polynomial expression to represent the surface shape. In the following examples, the SSD method and the PLY method also use the damped least squares method for changing the parameters.

Figure 16:
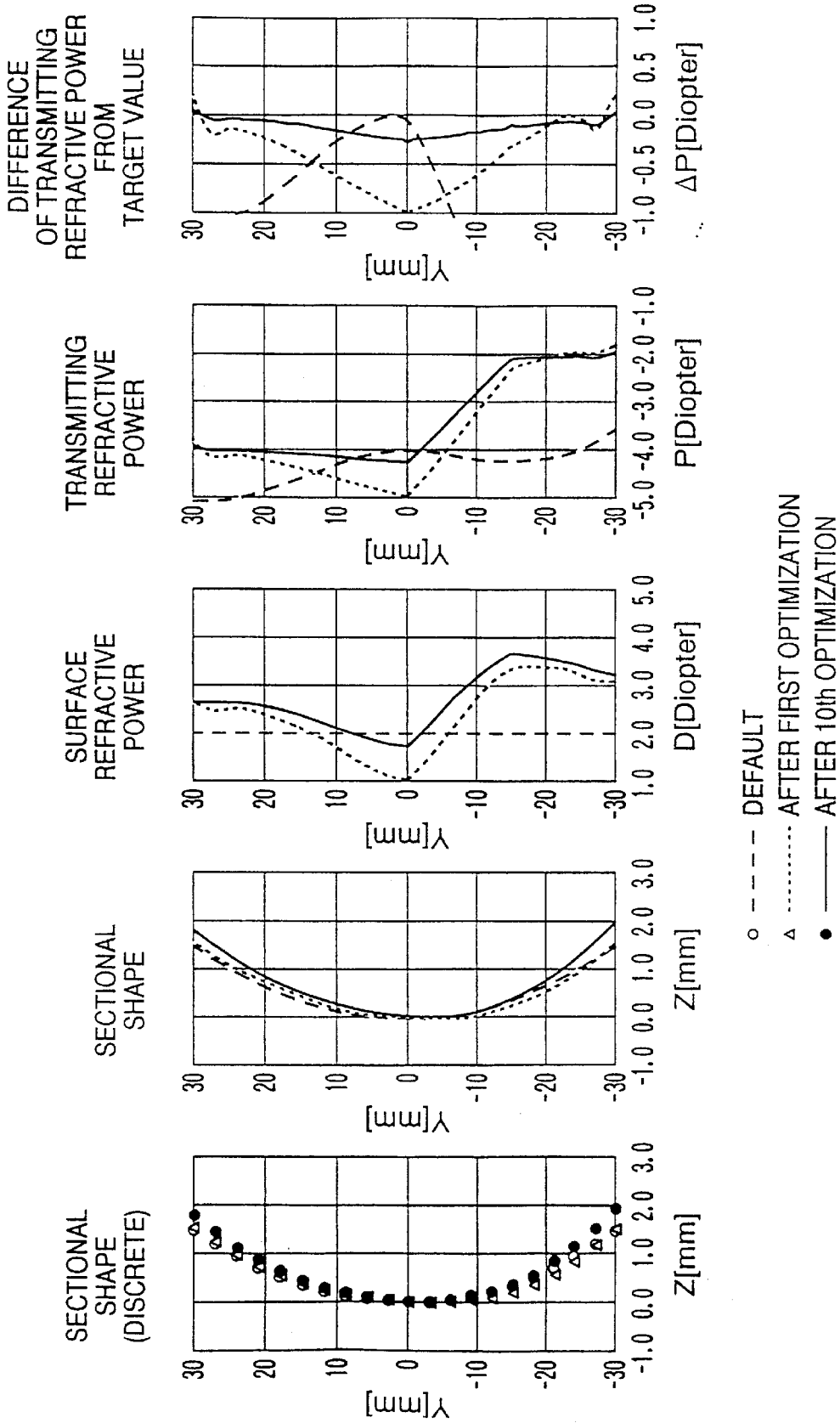
FIGS. 16A–16E are graphs showing progress of the optimization by a conventional SSD (Shape Spline Differential) method.

FIGS. 16A–16E are graphs showing progress of the optimization by the SSD method. The distribution of the sags $ZK_j$ at the lattice points whose pitch is 3 mm are applied as default values in the SSD method. The distribution of the default values in FIG. 16A is equivalent to that in FIG. 15A, which indicates the spherical curve whose radius of curvature is 300 mm, while the difference of the forms of the expression of the default values causes the difference of the graphs. That is, the horizontal axis of FIG. 16A shows the sag, while the horizontal axis of FIG. 15A shows the surface refractive power.

FIG. 16A shows the discrete distributions of the sags as the default values, values after first optimization and values after tenth optimization. FIGS. 16B, 16C, 16D and 16E show the continuous variation of the sectional shape, the continuous variation of the surface refractive power, the continuous variation of the transmitting refractive power and the difference from the target values, respectively.

As shown in FIG. 16E, the SSD method does not reach the target value even after ten times of the optimization.

FIGS. 17A–17E are graphs showing progress of the optimization by the PLY method. In the PLY method of this example, the progressive lens surface is represented by the following polynomial expression. Sag Z is a 26th order function of a variable Y and coefficients $A_i$ except zero and first orders are parameters to be changed.

$$Z(Y) = \sum_{i=2}^{26} A_i \cdot Y^i$$

Figure 17:
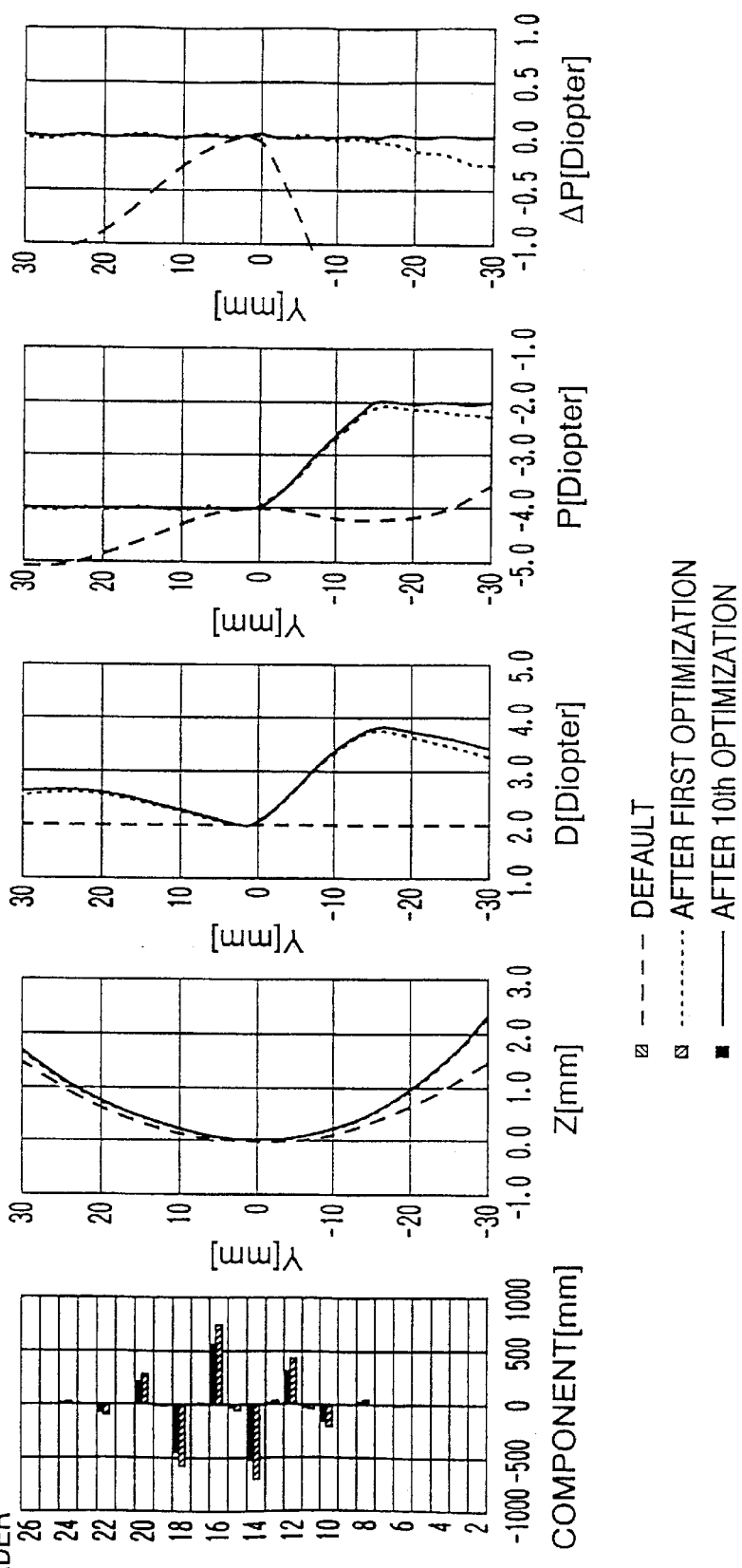
FIGS. 17A–17E are graphs showing progress of the optimization by a conventional PLY (Polynomial) method.

The default shape is a spherical surface whose radius of curvature is 300 mm as well as the example of the PSI method. FIG. 17A shows aspherical components at the point Y=30. The aspherical components are represented by $Z_i = A_i \cdot 30^i$ and they correspond to the values of Ai. FIGS. 17B, 17C, 17D and 17E show the continuous variation of the sectional shape, the continuous variation of the surface refractive power, the continuous variation of the transmitting refractive power and the difference from the target values, respectively.

As shown in FIG. 17E, a little difference from the target value remains after ten times of the optimization in the PLY method.

Figure 18:
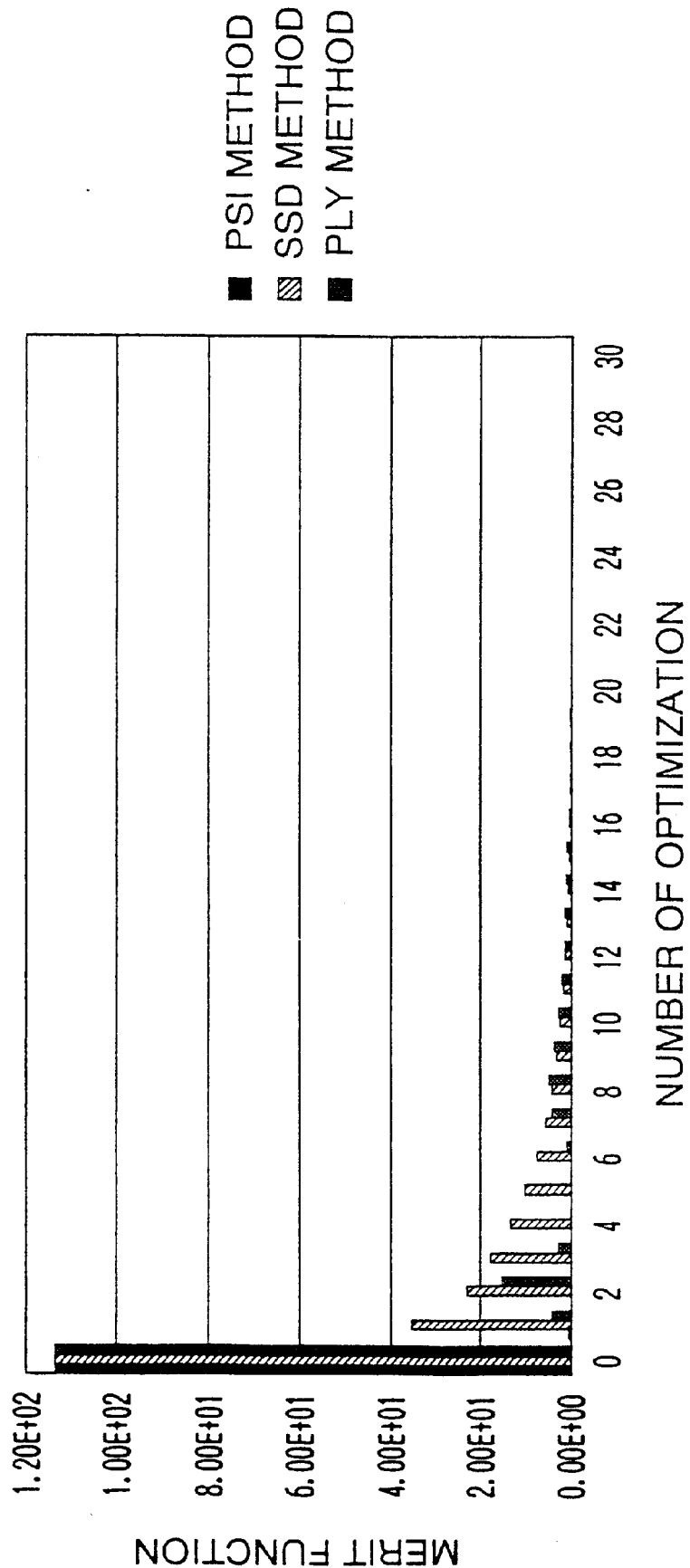
FIG. 18 is a graph showing the optimizing speeds of the design method of FIG. 5, the SSD method and the PLY method.

FIG. 18 is a graph showing a relationship between the number of the optimizations and the reduction of the merit function's value to compare the optimizing speeds of the PSI method, the SDD method and the PLY method. As compared with the PSI method, the SSD method has slower optimizing speed because of difficulty changing the sags by evaluating the transmitting refractive power, and the PLY method has also slower optimizing speed because of difficulty changing the local performance using the single polynomial expression. On the other hand, the PSI method reduces the merit function to about zero level after first optimization, which shows clearly superior effect as compared with the conventional methods.

The present disclosure relates to the subject matter contained in Japanese Patent Application No. HEI 10-216244, filed on Jul. 30, 1998, which is expressly incorporated herein by reference in its entirety.

What is claimed is:

1. A design method of an optical curved surface, comprising:

dividing an optical curved surface into a plurality of rectangular areas that are divided by a lattice;

defining an original lattice point on said lattice, a backbone line that crosses said original lattice point on said lattice, and standard lattice points that are the lattice points located on said backbone line except said original lattice point;

applying curvatures to all of the lattice points;

applying inclinations to said original lattice point and said standard lattice points;

applying sag to said original lattice point;

calculating a sectional shape of said curved surface along said backbone line based on said sag and inclination of said original lattice point and said curvatures of the lattice points on said backbone line;

calculating sags of said standard lattice points based on the calculated sectional shape;

calculating sectional shapes along orthogonal lines that are orthogonal to said backbone line based on the calculated sags and the applied inclinations of said standard lattice points and the applied curvatures of the lattice points on said orthogonal lines; and representing said rectangular areas as mathematical functions respectively based on the calculated sectional shapes.

2. The design method according to claim 1, further comprising:

evaluating optical performance of said optical curved surface represented by said mathematical functions; and changing at least one of the applied sag, inclinations and curvatures based on the evaluated result.

3. The design method according to claim 1, wherein the calculation of the sectional shape along said backbone line includes:

a first integration of said curvatures with the value corresponding to said inclination of said original lattice point as an integration constant to obtain a distribution of the values corresponding to said inclinations along said backbone line; and a second integration of said distribution of the values corresponding to said inclinations with said sag of said original lattice point as an integration constant to obtain said sectional shape along said backbone line.

4. The design method according to claim 1, wherein the calculation of the sectional shape along said orthogonal line includes:

a first integration of said curvatures with the value corresponding to said inclination of the standard lattice point on said orthogonal line as an integration constant to obtain a distribution of the values corresponding to said inclinations along said orthogonal line; and a second integration of said distribution of the values corresponding to said inclinations with said sag of said standard lattice point on said orthogonal line as an integration constant to obtain said sectional shape along said orthogonal line.

5. The design method according to claim 1, wherein said rectangular areas are relatively small where the variation of curvature is relatively large and said rectangular areas are relatively large where the variation of curvature is relatively small.

6. The design method according to claim 1, wherein said optical curved surface is divided by a first lattice whose pitch is relatively large and by a second lattice whose pitch is relatively small, and wherein the parameters are applied to the lattice points of said first lattice, said design method further including:

calculating the parameters for the lattice points of said second lattice by interpolating the parameters applied to said lattice points of the first lattice, calculating a sectional shape of said curved surface along said backbone line based on the parameters of the lattice points of said second lattice, and calculating a sectional shape of said curved surface along orthogonal lines that are orthogonal to said backbone line based on the parameters of the lattice points of said second lattice.

7. The design method according to claim 6, further comprising;

evaluating optical performance of said optical curved surface; and changing at least one parameter based on the evaluated result.

8. The design method according to claim 6, wherein said rectangular areas divided by said first lattice are relatively small where the variation of curvature is relatively large and said rectangular areas divided by said first lattice are relatively large where the variation of curvature is relatively small.

9. The design method according to claim 6, wherein said rectangular areas divided by said second lattice have constant size in the entire area of said optical curved surface.

10. A design method of an optical curved surface, comprising:

dividing an optical curved surface into a plurality of rectangular areas that are divided by a lattice;

defining an original lattice point on said lattice, a backbone line that crosses said original lattice point on said lattice, and standard lattice points that are the lattice points located on said backbone line except said original lattice point;

applying sectional surface powers to all of the lattice points;

applying inclinations to said original lattice point and said standard lattice points;

applying sag to said original lattice point;

calculating a sectional shape of said curved surface along said backbone line based on said sag and inclination of said original lattice point and said sectional surface powers of the lattice points on said backbone line;

calculating sags of said standard lattice points based on the calculated sectional shape;

calculating sectional shapes along orthogonal lines that are orthogonal to said backbone line based on the calculated sags and the applied inclinations of said standard lattice points and the applied sectional surface power of the lattice points on said orthogonal lines; and representing said rectangular areas as mathematical functions respectively based on the calculated sectional shapes.

11. The design method according to claim 10, further comprising:

evaluating optical performance of said optical curved surface represented by said mathematical functions; and changing at least one of the applied sag, inclinations and sectional surface powers based on the evaluated result.

12. A design method of an optical curved surface, comprising:

dividing an optical curved surface into a plurality of rectangular areas by a first lattice whose pitch is relatively large;

dividing said optical curved surface into a plurality of rectangular areas by a second lattice whose pitch is relatively small;

applying parameters to the lattice points of said first lattice;

calculating the parameters for the lattice points of said second lattice by interpolating the parameters applied to said lattice points of the first lattice;

representing said rectangular areas divided by said second lattice as mathematical functions respectively based on the calculated parameters of the lattice points of said second lattice;

evaluating optical performance of said optical curved surface represented by said mathematical functions; and changing at least one parameter applied to the lattice points of said first lattice based on the evaluated result.

13. A design method of an optical curved surface, comprising:

dividing an optical curved surface in an XY plane, which is perpendicular to a Z axis showing a reference direction, into a plurality of rectangular areas that are divided by a lattice that is shown by an I×J matrix, XY coordinate of each lattice point being represented by $(Xi, Yj)$ $[0 \leq i \leq I, 0 \leq j \leq J, i, j$ are integers$]$;

applying a sag in the Z-axis direction ZKL, an inclination in the X-axis direction BXKL, an inclination in the Y-axis direction BYKL, a curvature in the X-axis direction CXKL and a curvature in the Y-axis direction CYKL to an original lattice point $(XK, YL)$;

applying inclinations in the X-axis direction BXKj, curvatures in the X-axis direction CXKj and curvatures in the Y-axis direction CYKj to standard lattice points $(XK, Yj)$ $[j \neq L]$ that are located on a predetermined backbone line $X=XK$ that is parallel to the Y-axis and crosses said original lattice point $(XK, YL)$;

applying curvatures in the X-axis direction CXij to all of the lattice points $(Xi, Yj)$ $[i \neq K]$ except the lattice points on said backbone line;

integrating a function $v(XK, Y)$ that defines the continuous variation of CYKj of the standard lattice points $(XK, Yj)$ with respect to Y with the integration constant that is calculated from BYKL, said integration of the function $v(XK, Y)$ resulting in a function $h(XK, Y)$ that defines the continuous variation of the inclination in the Y-axis direction BYKj of the lattice points on said backbone line;

integrating said function $h(XK, Y)$ with respect to Y with the integration constant ZKL to find a function $f(XK, Y)$ that defines the continuous variation of the sags ZKj of the lattice points $(XK, Yj)$ on said backbone line;

integrating functions $u(X, Yj)$, which defines continuous variations of CXij of the lattice points $(Xi, Yj)$ arranged on orthogonal lines $Y=Yj$ that are orthogonal to said backbone line, with respect to X with the integration constants that are calculated from BXKj, said integration of said functions $u(X, Yj)$ resulting functions $g(X, Yj)$ that define continuous variations of the inclinations in the X-axis direction BXij of the lattice points on said orthogonal lines $Y=Yj$;

integrating said functions $g(X, Yj)$ with respect to X with integration constants ZKj that are the sags of the lattice points on said backbone line to find functions $f(X, Yj)$ that define continuous variations of the sag Zij of the lattice points on said orthogonal lines $Y=Yj$;

calculating BXij of the lattice points $(Xi, Yj)$ based on said functions $g(X, Yj)$;

differentiating said functions $g(Xi, Y)$, which define the continuous variations of BXij on lines $X=Xi$ that is parallel to the Y-aixs, by Y to find differentials Wij on the lattice points $(Xi, Yj)$;

integrating functions $w(X, Yj)$, which define the continuous variations of Wij of the lattice points $(Xi, Yj)$ on said orthogonal lines $Y=Yj$, with respect to X to find the inclinations in the Y-axis direction BYij of the lattice points $(Xi, Yi)$;

representing the curved surfaces in said rectangular areas as bicubic polynomial functions based on four parameters Zij, BXij, BYij and Wij for each of four lattice points surrounding each rectangular area;

evaluating optical performance of said optical curved surface represented by a set of said bicubic polynomial functions; and changing at least one of CXij, CYKJ and BXKj based on the evaluated result.

14. The design method according to claim 13, wherein said optical curved surface is divided by a first lattice that has an I×j matrix and by a second lattice that has a M×N matrix having a pitch smaller than said first lattice, XY coordinate of each lattice point of said second lattice being represented by $(X\sim m, Y\sim n)$ $[0 \leq m \leq M, 0 \leq n \leq N, m, m$ are integers$]$, an original lattice point $(X\sim P, Y\sim Q)$ of said second lattice corresponding to said original lattice point (XK, YL) of said first lattice; and wherein the sag ZKL, the inclinations in the X-axis direction BXKj, the inclination in the Y-axis direction BYKL, the curvatures in the X-axis direction CXij and the curvatures in the Y-axis direction CYKj are applied to the lattice points (Xi, Yj) of said first lattice, said design method further including:

calculating the sag Z~PQ, the inclinations in the X-axis direction BX~Pn, the inclination in the Y-axis direction BY~PQ, the curvatures in the X-axis direction CX~mn and the curvatures in the Y-axis direction CX~Pn for the lattice points (X~m, Y~n) of said second lattice by interpolating the corresponding parameters applied to said lattice points of the first lattice;

calculating a sectional shape of said curved surface based on the parameters of the lattice points of said second lattice;

representing said rectangular areas divided by said second lattice as mathematical functions respectively based on the calculated parameters of the lattice points of said second lattice;

evaluating optical performance of said optical curved surface represented by said mathematical functions; and changing at least one parameter applied to the lattice point of said first lattice based on the evaluated result.

* * * * *